US008012539B2

(12) United States Patent
Handlin, Jr. et al.

(10) Patent No.: US 8,012,539 B2
(45) Date of Patent: Sep. 6, 2011

(54) METHOD FOR MAKING SULFONATED BLOCK COPOLYMERS, METHOD FOR MAKING MEMBRANES FROM SUCH BLOCK COPOLYMERS AND MEMBRANE STRUCTURES

(75) Inventors: Dale Lee Handlin, Jr., Houston, TX (US); Scott Russell Trenor, Houston, TX (US); Gregory Paul Dado, Chicago, IL (US)

(73) Assignee: Kraton Polymers U.S. LLC, Houston, TX (US)

( * ) Notice: Subject to any disclaimer, the term of this patent is extended or adjusted under 35 U.S.C. 154(b) by 541 days.

(21) Appl. No.: 12/118,073

(22) Filed: May 9, 2008

(65) Prior Publication Data

US 2009/0280255 A1 Nov. 12, 2009

(51) Int. Cl.
C08L 53/00 (2006.01)
(52) U.S. Cl. ........... 427/358; 427/359; 525/98; 525/314
(58) Field of Classification Search .................. 427/358, 427/359; 525/98, 314
See application file for complete search history.

(56) References Cited

U.S. PATENT DOCUMENTS

| | | | |
|---|---|---|---|
| 2,880,253 | A | 3/1959 | Jezl et al. |
| 3,149,182 | A | 9/1964 | Porter |
| 3,450,795 | A | 6/1969 | Langer, Jr. |
| 3,577,357 | A | 5/1971 | Winkler |
| RE27,145 | E | 6/1971 | Jones |
| 3,595,942 | A | 7/1971 | Wald et al. |
| 3,634,549 | A | 1/1972 | Shaw et al. |
| 3,642,953 | A | 2/1972 | O'Neill et al. |
| 3,670,054 | A | 6/1972 | De La Mare et al. |
| 3,700,633 | A | 10/1972 | Wald et al. |
| 3,870,841 | A | 3/1975 | Makowski et al. |
| 3,985,830 | A | 10/1976 | Fetters et al. |
| 4,039,593 | A | 8/1977 | Kamienski et al. |

(Continued)

FOREIGN PATENT DOCUMENTS

WO 9938896 A1 8/1999

(Continued)

OTHER PUBLICATIONS

Li, et al., Synthesis and characterization of fluorinated block copolymers containing carboxylic or sulfonic groups, Reactive & Functional Polymers, 56:189-197 (2003).*

(Continued)

Primary Examiner — Peter D. Mulcahy
Assistant Examiner — Henry Hu
(74) Attorney, Agent, or Firm — Novak, Druce & Quigg; Michael A. Masse

(57) ABSTRACT

The present invention relates to an improved method for making sulfonated block copolymers and to methods for making membranes from such block copolymers. In particular, the present invention relates to an improved method for making sulfonated block copolymers having at least two polymer end blocks that are resistant to sulfonation and at least one polymer interior block that is susceptible to sulfonation where the sulfonation agent is $C_2$ to $C_8$ acyl sulfate. In the improved process the residual carboxylic acid formed from the $C_2$ to $C_8$ acyl sulfate is converted to $C_1$ to $C_4$ alkyl esters by contacting the residual carboxylic acid with at least a 0.9:1 molar ratio of a $C_1$ to $C_4$ alcohol to residual carboxylic acid, resulting in an improved sulfonated block copolymer solution. The present invention further relates to the use of such sulfonated block copolymer solutions to prepare various membranes and other articles.

7 Claims, 7 Drawing Sheets

U.S. PATENT DOCUMENTS

| | | | |
|---|---|---|---|
| 4,107,131 A | 8/1978 | Gergen et al. |
| 4,107,236 A | 8/1978 | Naylor et al. |
| 4,391,949 A | 7/1983 | St. Clair |
| 4,444,953 A | 4/1984 | St. Clair |
| 4,448,935 A | 5/1984 | Iovine et al. |
| 4,492,785 A | 1/1985 | Valint, Jr. et al. |
| 4,505,827 A | 3/1985 | Rose et al. |
| 4,946,899 A | 8/1990 | Kennedy et al. |
| 5,003,012 A | 3/1991 | Chamberlain et al. |
| 5,239,010 A | 8/1993 | Balas et al. |
| 5,468,574 A | 11/1995 | Ehrenberg et al. |
| 5,516,831 A | 5/1996 | Pottick et al. |
| 5,827,602 A | 10/1998 | Koch et al. |
| 5,925,621 A | 7/1999 | Zaneveld et al. |
| 6,028,115 A | 2/2000 | Zaneveld et al. |
| 6,110,616 A | 8/2000 | Sheikh-Ali et al. |
| 6,239,182 B1 | 5/2001 | Zaneveld et al. |
| 6,391,981 B1 | 5/2002 | Willis et al. |
| 6,444,767 B1 | 9/2002 | Schade et al. |
| 6,455,651 B1 | 9/2002 | Willis et al. |
| 6,492,469 B2 | 12/2002 | Willis et al. |
| 6,515,083 B2 | 2/2003 | Ozawa et al. |
| 6,531,241 B1 | 3/2003 | McEwen |
| 6,537,538 B2 | 3/2003 | Zaneveld et al. |
| 6,686,423 B1 | 2/2004 | Desbois et al. |
| 6,699,941 B1 | 3/2004 | Handlin et al. |
| 6,767,976 B2 | 7/2004 | Hamada et al. |
| 6,932,619 B2 | 8/2005 | Chen |
| 7,169,848 B2 | 1/2007 | Bening et al. |
| 7,169,850 B2 | 1/2007 | Handlin, Jr. et al. |
| 2003/0176582 A1 | 9/2003 | Bening et al. |
| 2004/0142910 A1* | 7/2004 | Vachon et al. ............... 514/152 |
| 2005/0137349 A1 | 6/2005 | Bening et al. |
| 2005/0215728 A1* | 9/2005 | Cao et al. ............... 525/342 |
| 2007/0021569 A1* | 1/2007 | Willis et al. ............... 525/314 |

FOREIGN PATENT DOCUMENTS

| | | | |
|---|---|---|---|
| WO | WO-99/38896 | * | 8/1999 |
| WO | 05003812 A1 | | 4/2005 |
| WO | WO-2005/030812 A1 | * | 4/2005 |
| WO | WO-2009/137678 A1 | * | 11/2009 |

OTHER PUBLICATIONS

Jongok Won, et al., Fixation of Nanosized Proton Transport Channels in Membranes, Macromolecules 2003, 36, Jan. 5, 2003, pp. 3228-3234.

Norgerg, Ken, DuPont Developing New Protective Suits for Military, First Responders, International Fiber Journal, Apr. 2005.

Coates, G.W., et al., Catalysts for the Living Insertion Polymerization of Alkenes: Access to New Polyolefin Architectures Using Ziegler-Natta Chemistry, Chem. Int. Ed. 2002, 41, 2236-2257.

Zhang, H., et al., Living Copolymerization of Ethylene with Styrene Catalyzed by (Cyclopentadienyl)(ketimide) titanium(IV) Complex-MAO Catalyst System, JACS Communications, 2005, p. 9364-9365.

Hawker, C.J., et al., New Polymer Synthesis by Nitroxide Mediated Living Radical Polymerizations, Chemical Reviews, 101(12) pp. 3661-3688 (2001).

Noolandi, J., et al., Theory of Block Copolymer Micelles in Solution, Macromolecules, 16, pp. 1443-1448 (1983).

Quintana, J.R., et al., Micellization of a Polystyrene-block-poly(ethylene/propylene) Copolymer in n-Alkanes. 1. Thermodynamic Study and 2. Structural Study, Macromolecules (25), pp. 3125-3128, 3129-3136 (1992).

Yeung, C.S., et al., Block copolymer micelle solutions: 1. Concentration dependence of polystyrene-poly(ethylene propylene) in heptane, and 2. An intrinsic excimer fluorescene study, Polymer 31, pp. 2089-2100, 2101-2111 (1990).

* cited by examiner

US 8,012,539 B2

METHOD FOR MAKING SULFONATED BLOCK COPOLYMERS, METHOD FOR MAKING MEMBRANES FROM SUCH BLOCK COPOLYMERS AND MEMBRANE STRUCTURES

FIELD OF THE INVENTION

The present invention relates to an improved method for making sulfonated block copolymers and to methods for making membranes from such block copolymers. In particular, the present invention relates to an improved method for making sulfonated block copolymers having at least two polymer end blocks that are resistant to sulfonation and at least one polymer interior block that is susceptible to sulfonation where the sulfonation agent is a $C_2$ to $C_8$ acyl sulfate. In the improved process the residual carboxylic acid formed from the acyl sulfate is converted to $C_1$ to $C_4$ alkyl esters, resulting in an improved sulfonated block copolymer solution. The present invention further relates to the use of such sulfonated block copolymer solutions to prepare various membranes and other articles.

BACKGROUND OF THE INVENTION

Through the years, there have been many modifications made to aromatic-containing polymers (e.g., styrenic block copolymers) to change and improve their properties. One such modification is to sulfonate the polymers. Such sulfonated polymers include those disclosed in U.S. Pat. No. 3,577,357; U.S. Pat. No. 3,642,953; U.S. Pat. No. 3,870,841; U.S. Pat. No. 6,110,616; U.S. Pat. No. 5,239,010; U.S. Pat. No. 5,516,831; U.S. Pat. No. 5,468,574; U.S. Pat. No. 7,169,850; U.S. Pat. No. 4,505,827; U.S. Pat. No. 4,492,785; and US Pub. App. 2007/0021569 among many other patents and patent applications. Once a polymer containing sulfonation-susceptible units is polymerized, and if desired, hydrogenated, it can be sulfonated using a sulfonation reagent. Although there are a number of known chemical reagents and routes that can be used to incorporate sulfonic acid groups into sulfonation-susceptible polymers, the difficulty of sulfonating polymers without gelation is widely appreciated in the art. Gelation of polymers can be caused by chemical gelation, physical gelation, or a combination thereof. Besides leading to polymer gelation, undesirable chemical cross-linking can also lead to polymer precipitation and/or intractability. Physical gelation, on the other hand, can be caused by non-covalent cross-linking. Physical gelation normally can be disrupted through appropriate solvent conditions. For example, Li, et al. *Reactive & Functional Polymers,* 56:189 (2003) describes the "insolubility" of sulfonated poly[styrene]-block-[2-[(per-fluorononenyl)oxy]ethyl methacrylate] in toluene as being due to "physically cross-linked network in the block copolymer resulting form the intermolecular associations of the ionic dipoles in the system." It teaches that the addition of polar co-solvent readily enables the dissolution of the polymer.

The literature teaches the use of various acyl sulfates, which can be readily prepared from carboxylic acid anhydrides and sulfuric acid, for the sulfonation of aromatic-containing polymers without the formation of a significant amount of sulfone cross-linking groups. Although chemical gelation can be reduced or controlled by the use of acyl sulfates, physical gelation or polymer precipitation still poses a serious problem for polymer sulfonation. To reduce physical gelation or polymer precipitation, the reaction media of choice for the acyl sulfate methods disclosed in the literature are typically halogenated solvents such as dichloroethane. Halogenated solvents are alleged to not only afford solubility to the unsulfonated polymer and the acyl sulfate reagent (e.g., acetyl sulfate), but also to maintain the resulting sulfonated polymer in soluble form (e.g., a homogeneous liquid), without precipitation or disabling gelation. The use of halogenated solvent is, however, highly undesirable from an environmental, health, and safety standpoint. Methods that can effectively sulfonate aromatic-containing block copolymers in non-halogenated aliphatic solvents with equal or greater levels of sulfonic acid incorporation than in halogenated solvents would be highly desirable. Advantages of non-halogenated aliphatic solvents include, for example, (a) not suffering from the substantial environmental concerns associated with halogenated solvents; (b) typically being used in the preparation of the starting block copolymers, thereby enabling the sulfonation of polymer without the need for polymer isolation and re-dissolution prior to sulfonation; and/or (c) being suitable solvents for subsequent downstream processing of the sulfonated polymer into films, membranes, coatings, and the like. Lower acyl sulfates such as $C_2$-$C_8$ sulfates, especially $C_2$ to $C_4$ sulfates have many advantages over the higher acyl sulfates or other sulfonation reagents. These lower acyl sulfates, as with other acyl sulfates, are capable of sulfonating aromatic rings with negligible sulfone formation, thereby proceeding without substantial chemical gelation.

The process for sulfonating certain styrene containing block copolymers with lower C2 to C4 sulfates is taught in copending patent application Ser. No. 60/885,804, filed Jan. 19, 2007, having a common inventor. The polymer resulting from the process of the '804 application is disclosed and claimed in prior US Pub. App. 2007/0021569, also including common inventors.

However, when using C2 to C8 acyl sulfates as the sulfonation agent, residual carboxylic acids are formed as a byproduct. Residual carboxylic acids, such as isobutyric acid in the sulfonated polymer solution are difficult to remove from the resulting polymer composition when the solvent is removed to form an article or end use application. For example, the presence of such residual carboxylic acid is a significant problem when it is desired to form membranes from the sulfonated polymer by casting the polymer. Such residual acid remains in the membrane, and evaporates slowly over time leading to internal stresses. The internal stress leads to catastrophic failure of the cast membrane by forming cracks. In addition, the membranes cast from solutions containing such residual carboxylic acids smell of the residual acid, and the smell is offensive. What is needed is a solution to the serious problems when using C2 to C8 acyl sulfate as the sulfonation agent.

Therefore, there is still a need in the art for a method for producing sulfonated aromatic-containing polymers in non-halogenated aliphatic solvents that (1) is substantially free of polymer precipitation and disabling gelation; (2) can efficiently reach a high degree of sulfonation; (3) uses lower acyl sulfates such as isobutyryl sulfate as the sulfonation reagent; and (4) doesn't result in offensive odor and internal stress in any resulting membrane cast from the polymer composition.

SUMMARY OF THE INVENTION

The presently described technology relates generally to the sulfonation of aromatic-containing block copolymers in non-halogenated solvents, wherein the sulfonation can be achieved with high or increased levels of sulfonic acid incorporation into the polymers, but with reduced amounts of residual carboxylic acids, such as isobutyric acid. The presently described technology is particularly useful for the production of sulfonated polymers such as those described in U.S. Published Patent Application 2007/0021569 by Kraton Polymers LLC, Houston, Tex. The disclosure of U.S. Published Patent Application 2007/0021569 is hereby incorporated herein by reference in its entirety. The overall process for preparing the sulfonated block copolymer is disclosed in U.S. Patent Application Ser. No. 60/885,804, filed Jan. 19, 2007 by Stepan Company. The disclosure of U.S. Patent Application Ser. No. 60/885,804 is hereby also incorporated herein by reference in its entirety.

In one aspect, the presently described technology provides a process for preparing sulfonated block polymers in non-halogenated aliphatic solvents, comprising the steps of:

providing a precursor block polymer having the general configuration of A-B-A, A-B-A-B-A, (A-B-A)$_n$X, (A-B)$_n$X, A-D-B-D-A, A-B-D-B-A, (A-D-B)$_n$X, (A-B-D)$_n$X, A-B-B-B-A, (A-B-B)$_n$X or a mixture thereof, where n is an integer from 2 to 30, and X is a coupling agent residue, and wherein each A block is a polymer block resistant to sulfonation, each D block is a polymer block resistant to sulfonation, and each B block is a polymer block susceptible to sulfonation, said A, D and B blocks are substantially free of olefinic unsaturation;

reacting the precursor block polymer with a $C_2$ to $C_8$ acyl sulfate in a reaction mixture further comprising at least one non-halogenated aliphatic solvent to form a sulfonated block polymer, wherein the initial concentration of the precursor block polymer is lower than a limiting concentration of the precursor block polymer based on the total weight of the reaction mixture, alternatively in the range of from about 0.1 wt % to about 0.1 wt % below the limiting concentration of the precursor block polymer based on the total weight of the reaction mixture, therein resulting in the sulfonated block copolymer and the formation of a residual carboxylic acid; and subsequently reacting the residual carboxylic acid with a $C_1$ to $C_4$ alcohol or mixture thereof in a molar ratio of alcohol to residual carboxylic acid of at least 0.9:1 to form the corresponding alkyl esters of the carboxylic acid and to reduce the residual level of the organic acid to less than 2.0 wt % based on the total weight of the solution, preferably less than 1.0 wt %.

The molar ratio of $C_1$ to $C_4$ alcohol to residual carboxylic acid is at least 0.9:1, preferably 0.9:1 to 4:1, more preferably 0.9:1 to 2:1.

The initial concentration of the precursor block polymer preferably is in the range of from about 1.0 wt % to about 30 wt % based on the total weight of the reaction mixture, alternatively from about 3.0 wt % to about 20 wt %. In at least some embodiments, the sulfonation reaction can be conducted in a manner that the reaction mixture is substantially free of polymer precipitation and free of disabling gelation. Alternatively, the sulfonation reaction is conducted in a manner that the reaction product (i.e., the resulting sulfonated polymer in a non-halogenated aliphatic solvent) is substantially free of polymer precipitation and free of disabling gelation. Alternatively, both the reaction mixture and reaction product in accordance with the present technology is substantially free of polymer precipitation and free of disabling gelation. In accordance with some embodiments, the reaction mixture of the present technology is substantially free of halogenated solvents.

The sulfonation reagents used in accordance with some embodiments of the present technology comprises an acyl group of from about 2 to about 8 carbon atoms, alternatively from about 3 to about 8 carbon atoms, alternatively from about 3 to about 5 carbon atoms. One preferred example is isobutyryl sulfate. The acyl sulfate can be obtained in an in-situ reaction conducted, for example, at the same temperature in which the sulfonation reaction is conducted, or alternatively at a different temperature of from about 20° C. to about 65° C. Alternatively, the acyl sulfate can be obtained from a separate reaction prior to addition to the reaction mixture. In at least some embodiments, the molar ratio of acyl sulfate to sulfonation susceptible repeat units in the reaction mixture is from about 0.1 to about 2.0, alternatively from about from about 0.1 to about 1.5, alternatively from about 0.1 to about 1.3.

Preferably, the sulfonated block polymer has a degree of sulfonation greater than about 0.4 meq/g, alternatively greater than about 0.6 meq/g, alternatively greater than 1.0 meq/g, alternatively greater than 1.4 meq/g. In accordance with some embodiments, the B blocks are sulfonated to the extent of from about 10 to about 100 mol percent, alternatively from about 20 to about 95 mol percent, alternatively from about 30 to about 90 mol percent, based on the units of sulfonation susceptible monomers in said B blocks.

The non-halogenated aliphatic solvent can be any compound which is a solvent for the precursor polymer or mixture of polymers and does not impede the sulfonation reaction. Typical examples include, but are not limited to, linear, branched, or cyclic saturated hydrocarbons of about 5 to 12 carbons, for example, cyclohexane, methylcyclohexane, cyclopentane, cycloheptane, cyclooctane, isopentane, n-hexane, isohexane, n-heptane, isoheptane, n-octane, isooctane, n-nonane, n-decane, or mixtures thereof. Also included are aliphatic hydrocarbon mixtures having a boiling point range of about 70 to about 220° C. In at least some embodiments, the non-halogenated aliphatic solvent comprises a first non-halogenated aliphatic solvent and a second non-halogenated aliphatic solvent. Preferably, the first non-halogenated aliphatic solvent is a solvent for the precursor polymer (e.g., cyclohexane or methylcyclohexane) and the second non-halogenated solvent is chosen such that it is miscible with the other solvent, but is a poor solvent for sulfonation susceptible block(s) of the precursor polymer in the process temperature range and also does not impede the sulfonation reaction. In the case where the sulfonation susceptible block(s) of the precursor polymer is polystyrene, suitable solvents which are poor solvents for polystyrene are linear and branched aliphatic hydrocarbons up to about 12 carbon atoms, for example hexane, heptane, octane, 2-ethyl hexane, isooctane, nonane, decane, paraffinic oils, mixed paraffinic solvents and the like.

In another aspect, the presently described technology provides a process for preparing sulfonated block polymers in non-halogenated aliphatic solvents, comprising the step of forming micelles in a reaction mixture. The sulfonation reaction in accordance with this process can be conducted in a manner that is substantially free of sulfonated block polymer precipitation and free of substantial gelation in the reaction mixture and/or reaction product.

In another aspect, the sulfonated block copolymer, ester of residual carboxylic acid and at least one non-halogenated aliphatic solvent prepared by the process of the invention comprises a liquid composition, where the concentration of sulfonated block copolymer is 2 wt % to 30 wt %, alternatively 5 to 20 wt %, based on the total weight of the liquid composition.

The sulfonated block copolymers of the present invention make it possible to achieve high water transport properties while maintaining sufficient wet strength for a wide variety of applications by using sulfonated block copolymers having one or more internal blocks that are susceptible to sulfonation and outer blocks that are resistant to sulfonation. These sulfonated saturated block copolymers of the present invention exhibit a balance of properties, including water transport, wet strength, dimensional stability and processability that have heretofore been unachievable. It has been discovered that when sulfonation is limited to one or more internal block(s) of the block copolymer, hydrophobicity of the outer blocks is retained, and hence their integrity in the presence of a hydrated center or rubber phase. The means by which sulfonation would be directed selectively to the internal or interior block is by, for example, the use of para substituted styrenic monomers such as para-tert-butylstyrene in the outer blocks. The large alkyl substituent at the para-position on the styrene ring reduces the reactivity of the ring towards sulfonation, thereby directing the sulfonation to one or more of the internal or interior block(s) of the polymer.

A key feature of sulfonated block copolymers having sulfonation resistant end blocks is that they can be formed into solid objects or articles which retain their solid character even in the presence of an excess of water. A solid is recognized as a material that does not flow under the stress of its own weight. The polymers of the present invention may be cast into solid membranes. While these membranes efficiently transport water vapor, they are solids even in the presence of an excess of water. The solid character of these membranes in water may be demonstrated by testing their resistance to flow under tensile stress while submerged in water. A simple tensile test, according to the methods outlined in ASTM D412, may be performed on the membrane while it is submerged in a bath of water; this measurement may be taken as a measure of the wet strength of the material. This test is usefully employed on a membrane that has been equilibrated in excess water. Materials that exhibit a wet tensile strength in excess of 100 pounds per square inch of cross sectional area are strong solids. Importantly, they are strong solids even in the presence of an excess of water. Clearly, such materials are not soluble in water. Water soluble materials will have no measurable strength when evaluated using the modified procedure of ASTM D412 which has been outlined above. Further, such materials are not dispersed in water. An aqueous dispersion of the polymer will have no measurable strength when tested using the modified procedure of ASTM D412 as discussed above. The polymer membranes of the present invention are not soluble in water and do not form dispersions when contacted with an excess of water. The newly discovered polymer membranes have good water vapor transport properties and have tensile strengths when equilibrated with water in excess of 100 psi. They are solids even when wet.

A distinguishing feature of the block copolymers of the present invention which have been selectively sulfonated in an interior block is that they can be formed into objects having a useful balance of properties that have heretofore been unachievable, including strength even when equilibrated with water, water vapor transport behavior, dimensional stability, and processability. The hydrophobic blocks and their position at the ends of the block copolymer chain contribute to the wet strength, dimensional stability and processability of these polymers and objects formed from them. The sulfonated block(s) positioned in the interior of the copolymer allow effective water vapor transport. The combined properties afford a unique material. As a result of the above, the sulfonated block copolymers of the present invention are capable of being utilized more effectively in a wide variety of uses in which the prior art sulfonated polymers proved deficient due to the weakness of such polymers in water. Note that sulfonated block copolymers that are "water soluble" or "water dispersed" by their nature would not have sufficient tensile strength for the applications disclosed herein.

Alternatively, the present invention broadly comprises an improvement in the process for preparing a sulfonated block copolymer where a precursor block copolymer having at least two end blocks A and at least one interior block B, wherein each A block is a polymer block resistant to sulfonation and each B block is a polymer block susceptible to sulfonation, is reacted with a C2 to C8 acyl sulfate in a reaction mixture further comprising at least one non-halogenated aliphatic solvent to form a solution of sulfonated block copolymer containing residual carboxylic acid, the improvement comprising wherein the residual carboxylic acid is subsequently reacted with a molar ratio of a C1 to C4 alcohol or mixture thereof to residual carboxylic acid of at least 0.9:1, to form the corresponding alkyl esters of the residual carboxylic acid and to reduce the residual level of the residual carboxylic acid to less than 2.0 wt % based on the total weight of the solution.

In one aspect of the invention, the process for preparing the sulfonated block polymers is conducted in a manner that is substantially free of polymer precipitation and free of disabling gelation in the reaction mixture. Further, the initial concentration of the precursor block polymer is in the range of from about 1.0 wt % to a concentration that is about 0.1 wt % below the limiting concentration of the precursor block polymer based on the total weight of the reaction mixture, alternately the range of from about 3.0 wt % to a concentration that is about 0.1 wt % below the limiting concentration of the precursor block polymer based on the total weight of the reaction mixture.

Typically, in the sulfonated block copolymer, the mol percentage of end blocks will be sufficient such that the block copolymer will be insoluble in water and non-dispersible in water. In said block copolymer, the mol percent of the end blocks can be greater than 15%, preferably greater than 20%. In other instances, the mol percent of the end blocks can be greater than 20% and less than 70%, preferably greater than 20% and less than 50%. The hydrophobic units of the end blocks contribute to the block copolymer's insolubility. Furthermore, if the end block mol percent approaches the lower values, hydrophobicity of the entire block copolymer can be adjusted by incorporating hydrophobic monomer units into the interior blocks, including A blocks as well as B blocks.

Throughout the current application with regard to the present invention, the following terms have the following meanings. "Resistant to sulfonation" means that little, if any, sulfonation of the block occurs. "Susceptible to sulfonation" means that sulfonation is very likely to occur in the blocks referenced. The expression "resistant to sulfonation" as used with regard to the present invention with regard to end blocks and the expression "susceptible to sulfonation" with regard to the interior blocks are meant to express that sulfonation occurs primarily in the interior block(s) of the copolymer so that the degree of sulfonation which occurs in the interior block(s), relative to the total degree of sulfonation of the block copolymer, is in every instance, higher than the degree of sulfonation which occurs in the end blocks. The degree of sulfonation in the interior block(s) is at least 85% of the total overall sulfonation of the block copolymer. In alternative embodiments, the degree of sulfonation in the interior block(s) is at least 90% of the total sulfonation, with the preferred amount in this embodiment being at least 95% of the total sulfonation. In some embodiments, the end blocks may show no sulfonation. Note that throughout the specification there are discussions relating to end blocks and interior blocks. In many instances, the structures related to end blocks represented by "A" and interior blocks represented by "B" are used. Such discussions, unless indicated otherwise, are not intended to be limited to only those sulfonated block copolymers of the present invention that contain "A" end blocks and "B" interior blocks but are instead intended to be discussions that are representative of all structures of embodiments of the present invention in which end blocks that are resistant to sulfonation are represented by "A", "A1", "A2" or "D" blocks and interior blocks that are susceptible to sulfonation are represented by "B", "B1", "B2", "E" or "F" blocks. Furthermore, note that in some instances, more than one interior block may be susceptible to sulfonation. In those instances, the blocks may be the same or they may be different.

In addition, the term "containing no significant levels of unsaturation" means that the residual olefin unsaturation of the block copolymer is less than 2.0 milliequivalents of carbon-carbon double bonds per gram of polymer, preferably less than 0.2 milliequivalents of carbon-carbon double bonds per gram of block copolymer. This means, e.g., that for any conjugated diene polymer component present in said sulfonated block copolymer, that such conjugated diene must be hydrogenated such that at least 90% of the double bonds are reduced by the hydrogenation, preferably at least 95% of the double bonds are reduced by the hydrogenation, and even more preferably at least 98% of the double bonds are reduced by the hydrogenation.

In still another aspect, the present invention comprises an article formed at least in part from a composition comprising the inventive sulfonated block copolymer. In particular, the present invention contemplates articles, such as, for example, fuel cells, proton exchange membranes for fuel cells, dispersions of metal impregnated carbon particles in sulfonated polymer cement for use in electrode assemblies, including electrode assemblies for fuel cells, fabrics, coated fabrics, surgical supplies and devices, water treatment membranes, filtration membranes, air conditioning membranes, heat recovery membranes, desalination membranes, adhesives, personal hygiene articles, super absorbent articles, binders for super absorbents and antifouling coatings. Specific examples of such articles include, but are not limited to, selective, permeability membranes formed in part from a composition comprising the sulfonated block copolymer. Other uses include fibers, tubes, fabrics, sheets, coatings for woven and non-woven fabrics and laminates. Specific applications include, but are not limited to, breathable protective clothing and gloves for first responders, firefighters, chemical and biological workers, agricultural workers, medical employees, and military personnel involved in handling potentially hazardous materials; sports and recreational clothing; tenting; selective membranes for industrial, medical and water purification applications; and systems which avoid moisture build up inside the walls and between the floor and foundation of a house. Other specific applications are in personal hygiene, including use as super absorbents or binders for super absorbents in diapers or incontinence products. Still other specific applications include marine coatings and antifouling coatings in general. Yet other applications include coatings for membranes, such as coatings on polysulfone desalination membranes.

In yet another aspect, the present invention includes a process for preparing a membrane, comprising:
(a) applying the composition comprising sulfonated block copolymer, ester of residual carboxylic acid and non-halogenated aliphatic solvents of the present invention onto the surface of a removable substrate (preferably in a humid environment),
(b) spreading the composition to form a uniform thickness layer on the removable substrate,
(c) allowing the solvents to evaporate from the composition resulting in a solid membrane, and
(d) removing the solid membrane from the removable substrate.

In yet another aspect, the present invention includes a process for preparing a two layer membrane, comprising:
(a) applying the composition comprising the sulfonated block copolymer, ester of residual carboxylic acid and non-halogenated aliphatic solvents of the present invention onto a porous substrate,
(b) spreading the composition to form a uniform thickness layer on the surface of the porous substrate layer, and
(c) allowing the solvents to evaporate from the composition resulting in a solid membrane.

In yet another aspect, the present invention includes an article formed from the sulfonated block copolymer composition prepared by the process of the present invention, said composition comprising:
(a) a sulfonated block copolymer which, prior to hydrogenation, has the general configuration A-B-A, A-B-A-B-A, (A-B-A)$_n$X, (A-B)$_n$X, A-D-B-D-A, A-B-D-B-A, (A-D-B)$_n$X, (A-B-D)$_n$X, A-B-B-B-A, (A-B-B)$_n$X or mixtures thereof, where n is an integer from 2 to about 30, and X is a coupling agent residue and wherein:
(i) each A block is a polymer block resistant to sulfonation, each D block is a polymer block resistant to sulfonation, and each B block is a polymer block susceptible to sulfonation, said A, D and B blocks containing no significant levels of olefinic unsaturation;
(ii) each A block independently having a peak molecular weight between 1,000 and 60,000, each D block independently having a peak molecular weight between 1,000 and 50,000, and each B block independently having a peak molecular weight between 10,000 and 300,000;
(iii) each A block comprises one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;
(iv) each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof;
(v) each D block comprises polymers having a glass transition temperature less than 20° C. and a peak molecular weight of between 1000 and 50,000, said D block being selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) silicone polymer, (iv) polymerized isobutylene and (v) mixtures thereof, wherein any segments containing polymerized 1,3-butadiene or isoprene are subsequently hydrogenated; and
(vi) the mol percent of vinyl aromatic monomers which are unsubstituted styrene monomers, ortho-substituted styrene monomers, meta-substituted styrene monomers, alpha-methylstyrene, 1,1-diphenylethylene and 1,2-diphenylethylene in each B block is between 10 mol percent and 100 mol percent, (b) about 0.08 to about 35 wt % of a C1 to C4 alkyl ester of the residual carboxylic acid; and (c) less than 2.0 wt % of residual carboxylic acid, the weight percent based on the total weight of the block copolymer composition.

DETAILED DESCRIPTION OF THE INVENTION

Figure 1:
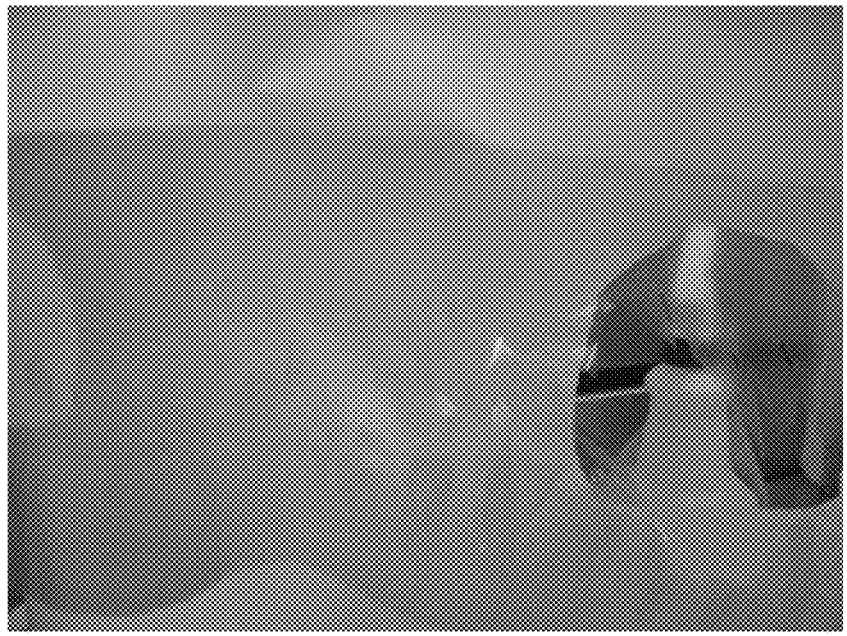
FIG. 1 shows a photograph of a prior art membrane formed from a sulfonated block copolymer composition containing about 3.1 wt % of residual isobutyric acid.

The base polymers needed to prepare the sulfonic acid containing block copolymers of the present invention may be made by a number of different processes, including anionic polymerization, moderated anionic polymerization, cationic polymerization, Ziegler-Natta polymerization, and living or stable free radical polymerization. Anionic polymerization is described below in the detailed description, and in the patents referenced. Moderated anionic polymerization processes for making styrenic block copolymers have been disclosed, for example, in U.S. Pat. Nos. 6,391,981, 6,455,651 and 6,492,469, each incorporated herein by reference. Cationic polymerization processes for preparing block copolymers are disclosed, for example, in U.S. Pat. Nos. 6,515,083 and 4,946,899, each incorporated herein by reference. Living Ziegler-Natta polymerization processes that can be used to make block copolymers were recently reviewed by G. W. Coates, P. D. Hustad, and S. Reinartz in Angew. *Chem. Int. Ed.,* 2002, 41, 2236-2257; a subsequent publication by H. Zhang and K. Nomura (JACS Communications, 2005) describes the use of living Z-N techniques for making styrenic block copolymers specifically. The extensive work in the field of nitroxide mediated living radical polymerization chemistry has been reviewed; see C. J. Hawker, A. W. Bosman, and E. Harth, *Chemical Reviews,* 101(12), pp. 3661-3688 (2001). As outlined in this review, styrenic block copolymers could be made using living or stable free radical techniques. For the polymers of the present invention, nitroxide mediated polymerization methods will be the preferred living or stable free radical polymerization process, but is not preferred for the overall anionic process.

1. Polymer Structure

One of the important aspects of the present invention relates to the structure of the sulfonated block copolymers. In one embodiment, these block copolymers made by the present invention will have at least two polymer end or outer blocks A and at least one saturated polymer interior block B wherein each A block is a polymer block resistant to sulfonation and each B block is a polymer block susceptible to sulfonation.

Preferred structures have the general configuration A-B-A, $(A-B)_n(A)$, $(A-B-A)_n$, $(A-B-A)_nX$, $(A-B)_nX$, A-B-D-B-A, A-D-B-D-A, $(A-D-B)_n(A)$, $(A-B-D)_n(A)$, $(A-B-D)_nX$, $(A-D-B)_nX$, A-B-B-B-A, $(A-B-B)_nX$ or mixtures thereof, where n is an integer from 2 to about 30, X is coupling agent residue and A, B and D are as defined hereinbefore. Further, the designation A-B-B-B-A may be equivalent to A-B-B1-B-A.

Most preferred structures are either the linear A-B-A, $(A-B)_2X$, $(A-B-D)_n X\, 2X$ and $(A-D-B)_n X\, 2X$ structures or the radial structures $(A-B)_nX$ and $(A-D-B)_nX$ where n is 3 to 6. Such block copolymers are typically made via anionic polymerization, cationic polymerization or Ziegler-Natta polymerization. Preferably, the block copolymers are made via anionic polymerization. It is recognized that in any polymerization, the polymer mixture will include a certain amount of A-B diblock copolymer, in addition to any linear and/or radial polymers.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization.

The para-substituted styrene monomers are selected from para-ethylstyrene, para-n-propylstyrene, para-iso-propylstyrene, para-n-butylstyrene, para-sec-butylstyrene, para-isobutylstyrene, para-t-butylstyrene, isomers of para-decylstyrene, isomers of para-dodecylstyrene and mixtures of the above monomers. Preferred para-substituted styrene monomers are para-t-butylstyrene monomers. Monomers may be mixtures of monomers, depending on the particular source. It is desired that the overall purity of the para-substituted styrene monomers be at least 90% wt, preferably at least 95% wt, and even more preferably at least 98% wt of the desired para-substituted styrene monomer.

When the A blocks are polymers of ethylene, it may be useful to polymerize ethylene via a Ziegler-Natta process, as taught in the references in the review article by G. W. Coates et. al, as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks will typically be between about 1,000 and about 60,000.

When the A blocks are polymers of alpha olefins of 3 to 18 carbon atoms, such polymers are prepared via a Ziegler-Natta process, as taught in the references in the review article by G. W. Coates et. al, as cited above. Preferably the alpha olefins are propylene, butylene, hexane or octene, with propylene being most preferred. The block molecular weight for such alpha olefin blocks will typically be between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since unhydrogenated polymerized cyclodiene blocks would be susceptible to sulfonation.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. Nos. 3,670,054 and 4,107,236, which disclosures are herein incorporated by reference.

The A blocks may also be polymers of acrylic esters or methacrylic esters. These polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester in the present invention. Examples of the anionic polymerizable monomer that can be optionally used include methacrylic or acrylic monomers such as trimethylsilyl methacrylate, N-isopropylmethacrylamide, N-tert-butylmethacrylamide, trimethylsilyl acrylate, N-isopropylacrylamide, and N-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers may be used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers mentioned for the B blocks. In some embodiments, the A blocks may contain up to 10 mol percent, preferably they will contain only up to 5 mol percent, and particularly preferably only up to 2 mol percent of the vinyl aromatic monomers mentioned in the B blocks. However, in the most preferred embodiments, the A blocks will contain no vinyl monomers mentioned in the B blocks. Accordingly, the sulfonation level in the A blocks may be from 0 up to 15 mol percent of the total monomers in the A block. Note that the ranges can include all combinations of mol percents listed herewith.

With regard to the saturated B blocks, each B block comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers noted immediately before, the B blocks may also comprise a hydrogenated copolymer of such monomer (s) with a conjugated diene selected from 1,3-butadiene, isoprene and mixtures thereof, having a vinyl content of between 20 and 80 mol percent. These copolymers with hydrogenated dienes may be random copolymers, tapered copolymers, block copolymers or controlled distribution copolymers. Accordingly, there are two preferred structures: one in which the B blocks are hydrogenated and comprise a copolymer of conjugated dienes and the vinyl aromatic monomers noted in this paragraph, and another in which the B blocks are unsubstituted styrene monomer blocks which are saturated by virtue of the nature of the monomer and do not require the added process step of hydrogenation. The B blocks having a controlled distribution structure are disclosed in U.S. Pat. No. 7,169,848, which disclosure is herein incorporated by reference. The '848 patent also discloses the preparation of sulfonated block copolymers, albeit not the structures claimed in the present invention. The B blocks comprising a styrene block are described herein. In one preferred embodiment, the saturated B blocks are unsubstituted styrene blocks, since the polymer will not then require a separate hydrogenation step.

In addition, another aspect of the present invention is to include at least one impact modifier block D having a glass transition temperature less than 20° C. One such example of an impact modifier block D comprises a hydrogenated polymer or copolymer of a conjugated diene selected from isoprene, 1,3-butadiene and mixtures thereof having a vinyl content prior to hydrogenation of between 20 and 80 mol percent and a peak molecular weight of between 1,000 and 50,000. Another example would be an acrylate or silicone polymer having a peak molecular weight of 1,000 to 50,000. In still another example, the D block would be a polymer of isobutylene having a peak molecular weight of 1,000 to 50,000.

Each A block independently has a peak molecular weight between about 1,000 and about 60,000 and each B block independently has a peak molecular weight between about 10,000 and about 300,000. Preferably each A block has a peak molecular weight of between 2,000 and 50,000, more preferably between 3,000 and 40,000 and even more preferably between 3,000 and 30,000. Preferably each B block has a peak molecular weight of between 15,000 and 250,000, more preferably between 20,000 and 200,000, and even more preferably between 30,000 and 100,000. Note that the ranges can also include all combinations of said peak molecular weights listed herewith. As used herein, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. Note that the ranges can include all combinations of mol percents listed herewith.

As for the saturated B block, in one preferred embodiment the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. Note that the ranges can include all combinations of mol percents listed herewith.

As for the level of sulfonation, typical levels are where each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. Note that the range of sulfonation can include all combinations of mol percents listed herewith. The level of sulfonation may be analyzed, for example, by two separate titrations (the "two-titration method") to determine the levels of styrenic polymer sulfonic acid, sulfuric acid, non-polymeric by-product sulfonic acid (2-sulfoisobutyric acid), and non-sulfonated by-product isobutyric acid. For each titration, an aliquot of about five (5) grams of the reaction product solution is dissolved in about 100 mL of tetrahydrofuran and about 2 mL of water and about 2 mL of methanol are added. In the first titration, the solution is titrated potentiometrically with 0.1 N cyclohexylamine in methanol to afford two endpoints; the first endpoint corresponding to all sulfonic acid groups in the sample plus the first acidic proton of sulfuric acid, and the second endpoint corresponding to the second acidic proton of sulfuric acid. In the second titration, the solution is titrated potentiometrically with 0.14 N sodium hydroxide in about 3.5:1 methanol:water to afford three endpoints: The first endpoint corresponds to all sulfonic acid groups in the sample plus the first and second acidic proton of sulfuric acid; the second endpoint corresponds to the carboxylic acid of 2-sulfoisobutyric acid; and the third endpoint corresponds to isobutyric acid.

2. Overall Anionic Process to Prepare Polymers

With regard to the process to prepare the polymers, the anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present invention include the initial monomers noted above. Other important starting materials for anionic co polymerizations include one or more polymerization initiators. In the present invention such include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, each incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145, which descriptions are incorporated herein by reference.

Polymerization conditions to prepare the block copolymers of the present invention are typically similar to those used for anionic polymerizations in general. In the present invention polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It is recognized that the anionic polymerization process could be moderated by the addition of a Lewis acid, such as an aluminum alkyl, a magnesium alkyl, a zinc alkyl or combinations thereof. The affects of the added Lewis acid on the polymerization process are 1) to lower the viscosity of the living polymer solution allowing for a process that operates at higher polymer concentrations and thus uses less solvent, 2) to enhance the thermal stability of the living polymer chain end which permits polymerization at higher temperatures and again, reduces the viscosity of the polymer solution allowing for the use of less solvent, and 3) to slow the rate of reaction which permits polymerization at higher temperatures while using the same technology for removing the heat of reaction as had been used in the standard anionic polymerization process. The processing benefits of using Lewis acids to moderate anionic polymerization techniques have been disclosed in U.S. Pat. Nos. 6,391,981; 6,455,651; and 6,492,469, which are herein incorporated by reference. Related information is disclosed in U.S. Pat. Nos. 6,444,767 and 6,686,423, each incorporated herein by reference. The polymer made by such a moderated, anionic polymerization process can have the same structure as one prepared using the conventional anionic polymerization process and as such, this process can be useful in making the polymers of the present invention. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of Radial (Branched) Polymers Requires a Post-Polymerization Step called "coupling". In the above radial formulas n is an integer of from 2 to about 30, preferably from about 2 to about 15, and more preferably from 2 to 6, and X is the remnant or residue of a coupling agent. A variety of coupling agents are known in the art and can be used in preparing the coupled block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. Nos. 3,985,830; 4,391,949; and 4,444,953; as well as Canadian Patent No. 716,645, each incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

3. Process to Prepare Hydrogenated Block Copolymers.

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is necessary to selectively hydrogenate the block copolymer to remove any ethylenic unsaturation. Hydrogenation generally improves thermal stability, ultraviolet light stability, oxidative stability, and, therefore, weatherability of the final polymer, and reduces any chance for sulfonation of the A block or the D block.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942, 3,634,549, 3,670,054, 3,700,633, and Re. 27,145, the disclosures of which are incorporated herein by reference. These methods operate to hydrogenate polymers containing ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Once the hydrogenation is complete, the solution can be sulfonated.

4. Process to Make Sulfonated Polymers

Once the polymer is polymerized, and if desired, hydrogenated, it can be sulfonated using a sulfonation reagent such as an acyl sulfate in a non-halogenated solvent by processes of the presently described technology.

In general, the processes of the presently described technology can sulfonate styrene block copolymers of the structures as described above in a non-halogenated solvent such as cyclohexane or methylcyclohexane using acyl sulfates, or mixtures of such solvents with aliphatic solvents such as heptane, octane etc. The sulfonated polymers in the reaction systems of the present technology exhibit adequate solubility to achieve good sulfonation conversion. In some preferred embodiments of the present technology, the reaction systems are substantially free of halogenated solvents. In accordance with the methods of the present technology, high levels of styrene sulfonation can be achieved in a manner that is substantially free of polymer precipitation and/or disabling gelation in the reaction mixture, the reaction product, or both, by maintaining the precursor polymer concentration below a limiting concentration of the precursor polymer, at least during the early stages of sulfonation.

Generally, the polymer concentration falls within the range of from about 1 wt % to about 30 wt %, alternatively from about 1 wt % to about 20 wt %, alternatively from about 1% to about 15 wt %, alternatively from about 1% to about 12 wt %, or alternatively from about 1 wt % to about 10 wt %, based on the total weight of a reaction mixture that is preferably substantially free of halogenated solvents.

Note that the range of concentrations of the precursor polymers can include all combinations of weight percents listed herewith. For example, the sulfonation of a block copolymer of the structure (ptBS-EB-S)$_n$ and having a styrene content of about 42% and a para-tert-butylstyrene content of about 43% is conveniently carried out at about 5.0 to 10.0% polymer concentration, and preferably higher.

It has also been discovered that, at least in some embodiments, maintaining the polymer concentration below the limiting concentration can result in reaction mixtures with reduced concentrations of by-product carboxylic acid relative to the higher concentration conditions that lead to gelation. Further, the degree of styrene unit sulfonation that can be achieved without polymer precipitation or disabling gelation by the methods of the present technology unexpectedly far exceeds those reported in the literature for polystyrene sulfonation in non-halogenated aliphatic solvents.

Any known method for the generation of acyl sulfate may be used in performing the methods of the presently described technology. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following general formula:

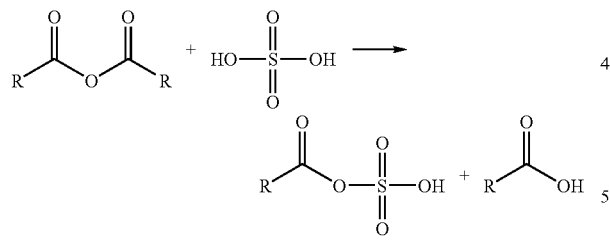

Acyl sulfates are subject to slow decomposition during the course of sulfonation reactions to afford alpha-sulfonated carboxylic acids of the following general formula:

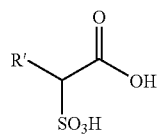

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 0.8 to about 1.4. The sulfuric acid used in this preferred method preferably has a concentration of greater than about 93% and more preferably has a concentration of greater than about 95%. Those skilled in the art will recognize that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is about 0.9 to about 1.2.

Additionally, the acyl sulfate reagent can also be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following general formula:

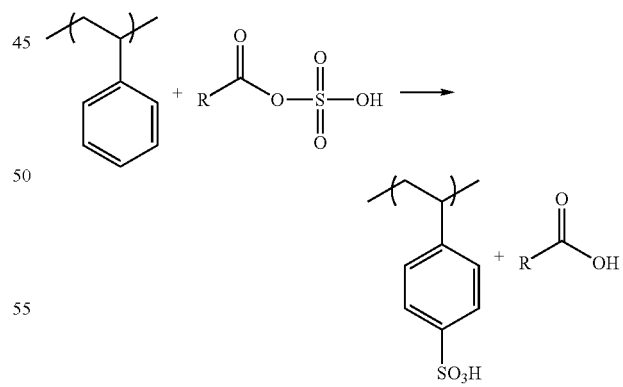

The amount of acyl sulfate reagent that may be used relative to the moles of styrene repeat units present in the polymer solution may range from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units in accordance with some embodiments of the present technology may be from about 0.1 to about 2.0, preferably from about 0.1 to about 1.5, and even more preferably from about 0.1 to about 1.3.

In accordance with at least some embodiments of the presently described technology, the degree of sulfonation of the vinyl aromatic monomers susceptible to sulfonation in the block polymers is greater than about 0.4 milliequivalents (meq) sulfonic acid per gram sulfonated polymer, alternatively greater than about 0.6 meq sulfonic acid per gram sulfonated polymer, alternatively greater than about 1.0 meq sulfonic acid per gram sulfonated polymer, alternatively greater than about 1.4 meq sulfonic acid per gram sulfonated polymer. For example, after the precursor polymers described above are sulfonated in accordance with the methods of the presently described technology, the typical levels of sulfonation are where each B block contains one or more sulfonic functional groups. Preferred levels of sulfonation are about 10 to about 100 mol percent, alternatively about 20 to 95 mol percent, alternatively about 30 to 90 mol percent, and alternatively from about 40 to about 70 mol percent based on the mol percent of vinyl aromatic monomers which can be unsubstituted styrene monomer, ortho-substituted styrene monomer, meta-substituted styrene monomer, alpha-methylstyrene monomer, 1,1-diphenylethylene monomer, 1,2-diphenylethylene monomer, or a mixture thereof in each B block. Note that the range of sulfonation can include all combinations of mol percents listed herewith.

The level or degree of sulfonation of a sulfonated polymer can be measured by a NMR and/or titration methods as known to people skilled in the art, and/or a method using two separate titrations as described in the Examples below and may be appreciated by people skilled in the art. For example, a resulting solution from the methods of the present technology can be analyzed by $^1$H NMR at 63° C. The percentage styrene sulfonation can be calculated from the integration of aromatic signals in the $^1$H NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkyl-carboxylic acid), and then calculate the degree of styrene sulfonation based on mass balance. Alternatively, the level of sulfonation can be determined by titration of a dry polymer sample, which has been redissolved in tetrahydrofuran with a standardized solution of NaOH in a mixed alcohol and water solvent. In this last case, rigorous removal of by-product acids are preferably ensured.

Without being bound by any particular theory, it is believed that the means by which a good sulfonation level can be achieved in a non-halogenated solvent without polymer precipitation or disabling gelation is through a mechanism in which the polymer forms micelles (aggregates in solution) that sequester the styrene sulfonic acid moieties away from the solvent, thereby preventing or minimizing polymer associative thickening-like behavior that can otherwise leads to gelation. The importance of such sequestration is exemplified by the fact that upon isolation from the reaction medium, the sulfonated polymer product will not redissolve in the same non-halogenated aliphatic solvent but will readily dissolve in more polar solvents or solvent blends such as tetrahydrofuran (THF) or mixtures of xylenes with isopropyl alcohol. Evidence for the formation of sulfonated polymer micelles and/or (aggregates) has been obtained via light scattering-based particle size analyses. In some instances, dependent on the starting polymer composition and solvent selection, the initial polymer solution prior to sulfonation may be largely free of micelles, as judged by light scattering under dilute conditions, and subsequently forms such aggregates relatively early in the sulfonation conversion. In other instances, the initial polymer solution may be comprised primarily of aggregated species that directly sulfonate with minimal change in light scattering profile. In yet some other instances, the initial polymer solution may be comprised of a mixture of micelles and non-aggregated polymer. Formation of micelles from block copolymers based on the different solubility of the blocks is well known in the art, see for example J. Noolandi and K. M. Hong, *Macromolecules* (16), page 1443, 1983 and J. R. Quintana, M. Villacampa, M. Munoz, A. Andrio and I. Katime, *Macromolecules*, (25), page 3125 and 3129, 1992. For light scattering from micellar solutions see A. S. Yeung and C. W. Frank, *Polymer,* 31, pages 2089-2100 and 2101-2111 (1990).

The presently described technology uses non-halogenated solvents to form reaction mixtures. In accordance with at least some embodiments of the present technology, the reaction mixtures are substantially free of halogenated solvents. The non-halogenated solvents can be linear, branched, and cyclic aliphatic hydrocarbons with from about 5 to about 12 carbons. Examples of suitable non-halogenated solvents include, but are not limited to, cyclohexane, methylcyclohexane, cyclopentane, cycloheptane, cyclooctane, isopentane, n-hexane, isohexane, n-heptane, isoheptane, n-octane, isooctane, nonane, decane and mixtures thereof. Also included are aliphatic hydrocarbons having a boiling point range of about 70 to about 220° C. Preferred non-halogenated solvents are cyclohexane, methylcyclohexane, cyclopentane, cycloheptane, cyclooctane, or mixtures thereof. More preferred non-halogenated solvents are cyclohexane, methylcyclohexane, or mixtures thereof.

It has been discovered that for at least some embodiments of the present technology, polymer micelles (aggregates) can be pre-formed before sulfonation even when a single non-halogenated solvent is used. It has been further discovered that for at least some other embodiments of the present technology, the addition of a second non-halogenated aliphatic solvent to a solution of the precursor polymer in a first non-halogenated aliphatic solvent can result in or assist the "pre-formation" of polymer micelles and/or aggregates. In this instance, preferably, the precursor polymer to be sulfonated is substantially soluble in the first non-halogenated solvent, which can be, for example, cyclohexane, and the sulfonation susceptible block is substantially insoluble in the second non-halogenated solvent, which can be, for example, n-heptane or other aliphatic hydrocarbons having a boiling point range of about 70 to about 220° C. In some instance, the pre-formed polymer micelles can allow the sulfonation of the polymer without substantial polymer gelation at considerably higher concentration than that can be achieved without the addition of the second solvent. In addition, this approach can, in some instances, substantially improve the utility of more polar acyl sulfates, such as $C_3$ acyl sulfate (propionyl sulfate), in terms of polymer sulfonation conversion rate and minimization of by-products. In other words, this approach can improve the utility of more polar sulfonation reagents.

The sulfonation reaction between the acyl sulfates and aromatic-containing polymers (e.g., styrenic block copolymers) of the presently described technology can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In an alternative embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 65° C. to expedite the completion of the reaction. In some instances, the lower temperature generation is useful to allow for slow $H_2SO_4$ addition—it may not be necessary to wait thereafter to heat the reaction mixture.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

The methods of the present technology are useful for the preparation of sulfonated styrenic block copolymers that have utility in the formation of membranes and coatings as described in U.S. Pub. Patent Application 2007/0021569. In some embodiments the solution of sulfonated polymer resulting from the instant process can be used without isolation of the polymer to form membranes, coatings or other articles either directly or with the addition of minor components to improve the performance of the article. It is also contemplated that the methods of the presently described technology can be utilized for sulfonating other classes of polymers, whether styrene-containing, other aromatic functional group-containing, unsaturated, or otherwise reactive towards sulfonation reagents, especially if they are capable of sequestering sulfonic acid groups away from the solvent through intramolecular "collapse" or intermolecular aggregation such that the polymers do not precipitate from or exhibit disabling gelation in non-halogenated aliphatic solvents.

5. Process to Neutralize Sulfonated Polymers

Another embodiment of the present invention is to "neutralize" the modified block copolymer with a base. This may be desirable whenever improved stability of the polymer or enhanced strength of the polymer at elevated temperatures is needed. Neutralization of the sulfonated block copolymer also tends to reduce the corrosive nature of the acid moieties, enhances the driving force for phase separation in the block copolymer, improves resistance to hydrocarbon solvents, and in many instances improves recovery of the sulfonated polymer from the byproducts of the sulfonation reaction. Neutralization is taught in U.S. Pat. Nos. 5,239,010 and 5,516,831, and in US Pub. App. No. 2007/0021569, which disclosures are herein incorporated by reference.

6. Reaction of Sulfonated Polymer Solutions with $C_1$ to $C_4$ Alcohols

One of the key aspects of the present invention relates to non-sulfonated residual carboxylic acid that is formed during the sulfonation of the block copolymer with the $C_2$ to $C_8$ acyl sulfate, for example isobutyric acid formed from isobutyryl sulfate generation and reaction. The amount of non-sulfonated residual carboxylic acid that may be generated is generally in the range of about 0.08 to 30 wt %, based on the total weight of the solution. It is important that the amount of non-sulfonated residual carboxylic acid in the solution after sulfonation be less than 2.0 wt %, based on the total weight of the solution during the sulfonation step, preferably less than 1.0 wt %. Otherwise, sufficient residual carboxylic acid will be present in the membranes or products made from the sulfonated block copolymer solution, and it will result in internal stress and will also be odorous. What has been found is that the level of this residual carboxylic acid can be readily reduced by reacting the solution formed by reaction of the $C_2$ to $C_8$ acyl sulfates with the precursor block copolymer with a $C_1$ to $C_4$ alcohol. $C_1$ to $C_4$ alcohols include methanol, ethanol, propanol, n-butanol and isobutanol, with methanol and ethanol being preferred. Methanol has been found to be the most effective and preferred since it is the fastest reacting and results in the most volatile ester. The residual carboxylic acid is converted to an ester, and such esters are more volatile than the corresponding acids, making it easier to remove them during forming processes. Further, the ester does not impart an offensive odor, since, for example, methyl and ethyl isobutyrate are often used as fragrance additives, while the acid is typically perceived as a more offensive odor. The reaction to form the ester is shown below, employing isobutyryl sulfate as the sulfonation agent and methanol as the $C_1$ to $C_4$ alcohol:

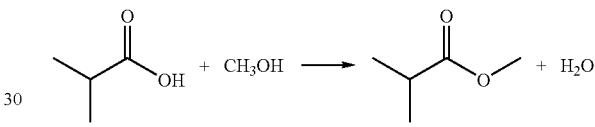

Figure 3:
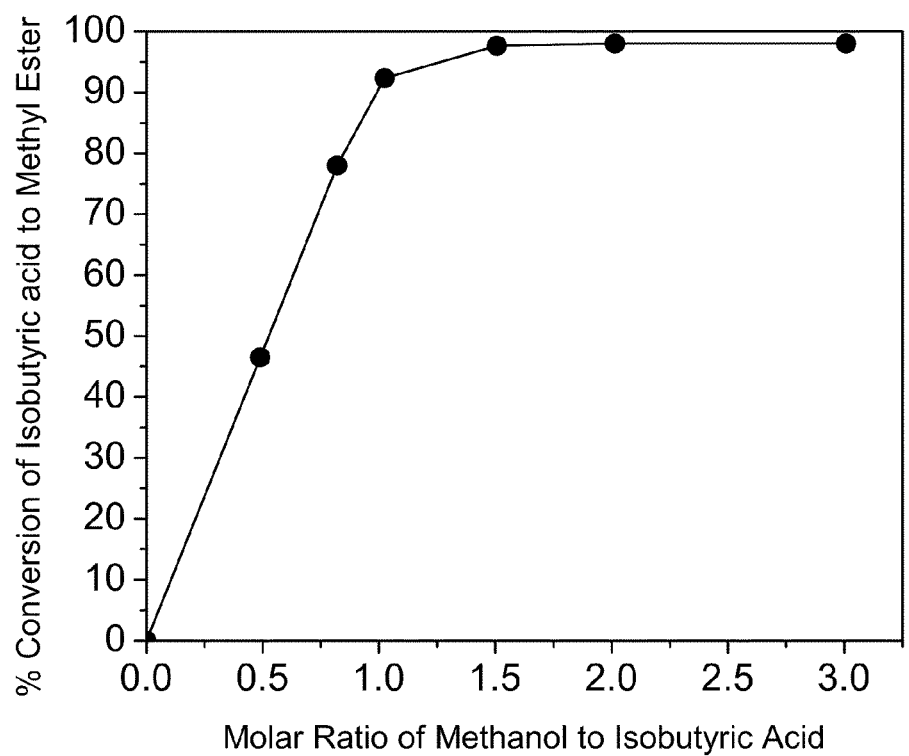
FIG. 3 shows the extent of reaction of methanol to form methyl butyrate as a function of the molar ratio of methanol to isobutyric acid according to the present invention.

It is important that the molar ratio of alcohol to residual carboxylic acid be at least 0.9:1, preferably 0.9:1 to 4:1, and more preferably 0.9:1 to 2:1. As shown in FIG. 3, in order to obtain at least about 90% esterification the molar ratio must be at least about 1:1. The esterification reaction produces water and reaches an equilibrium that is dependent on the molar ratio of the alcohol to residual carboxylic acid. Because additional water can shift the equilibrium of the esterification reaction away from desired ester, it is important that the alcohol used in the reaction is low in moisture content. Preferably the alcohol contains less than 5% $H_2O$ by weight, more preferably less than 1% $H_2O$ by weight. When the molar ratio of methanol to isobutyric acid is 1.5:1 and higher, the esterification level is about 98%. The selection of the amount of alcohol to be used may be dependent not only on the degree of residual acid esterification that is required, but also on the properties desired in downstream processing into films and other articles (i.e., role of solvent in film formation, correct phase separation, etc.), and also on the properties of the alcohol treated solution, corrosivity in particular.

With regard to other conditions, the temperature for the reaction may be about 10° C. to about 150° C., alternatively about 20° C. to about 100° C., and also alternatively about 20° C. to about 70° C. The time required for esterification reaction to approach completion is dependent on the temperature conditions, with the reaction proceeding more quickly at higher temperatures. Preferably, the amount of time allowed for esterification reaction to occur is sufficient to ensure that the reaction has reached maximum conversion prior to additional processing of the polymer solution into films, etc.

7. Process for Making Membranes

The novel compositions are particularly suitable for producing membranes with excellent performance characteristics. Such membranes include (1) free standing membranes, (2) composites where the membrane contains fabric, (3)

membranes where the sulfonated polymer is a thin layer on a support, and (4) coatings. These membranes are used in a wide variety of applications.

The invention further provides various processes for producing the membranes described above. For free standing membranes, a preferred process comprises a) preparing a solution comprising sulfonated block copolymer, ester of carboxylic acid and non-halogenated aliphatic solvents of the present invention, and b) shaping this solution by processes known per se, such as casting, doctoring, spraying or centrifugal processes, to give a membrane. In particular, the present invention relates to a process for preparing a membrane, comprising:

(a) applying the fluid composition of sulfonated block copolymer, ester of residual carboxylic acid and non-halogenated aliphatic solvents of the present invention onto the surface of a removable substrate, preferably in a humid environment, (b) spreading the fluid composition to form a uniform thickness layer on the removable substrate, (c) allowing the solvent to evaporate from the fluid composition resulting in a solid membrane, and (d) removing the solid membrane from the removable substrate.

Alternatively, the present invention relates to a process for preparing membrane containing at least two layers, comprising:

(a) applying the fluid composition of sulfonated block copolymer, ester of isobutyric acid and non-halogenated aliphatic solvents of the present invention onto a porous substrate, (b) spreading the fluid solution to form a uniform thickness layer on the surface of the porous substrate layer, and (c) allowing the solvent to evaporate from the fluid composition resulting in a membrane.

The shape of the membrane includes a wide variety of shapes, such as flat, tubular, round or according to a preform. The only requirement is that the membrane be reasonably uniform in thickness.

Another method for making the membrane involves pulling a porous substrate through the fluid solution, and allowing the excess solvent to evaporate from the impregnated substrate. In a preferred embodiment the porous substrate is selected from the group consisting of expanded poly(tetrafluoro)ethylene and a fibrous mat. The multilayer membrane may be porous or dense.

The novel free standing membranes usually have a thickness of at least about 5 µm, preferably up to about 300 µm. For applications in the fuel cell the thickness of the membranes is generally at least about 5 µm. For applications that are not free standing, such membranes have a thickness of at least about 0.1 µm, up to about 200 µm.

It is preferable to use polymer solutions with different viscosities, depending on the desired thickness of the membrane. For membranes of thickness of from 5 to 50 µm it is preferable to use polymer solutions with a viscosity of from 500 to 2000 mPas (measured at 80° C. on a solution of the polymers in the relevant solvent). For membranes of from 10 to 100 µm thickness it is preferable to use polymer solutions with a viscosity of from 1500 to 5000 mPas (measured at 80° C. on a solution of the polymers in the relevant solvent).

The novel membranes also feature excellent resistance to boiling water. For example, it has been found that novel membranes remain mechanically stable after 72 hours of treatment in boiling water at 100° C. The novel membrane preferably has a residual content of solvent of less than 2% by weight, most preferably less than 0.5% by weight.

It has been surprisingly found that the novel membranes potentially benefit from being cast in atmospheres with water present (or other polar solvents such as alcohols or esters present). When water is used preferred conditions include relative humidity greater than 10%, preferably greater than 40%. While not being bound to any particular theory, the moisture in the atmosphere seems to allow the sulfonated blocks to relax during casting leading to a more homogenous membrane.

8. Properties of Resulting Sulfonated Polymers

The polymers of the present invention, as a direct consequence of being selectively sulfonated in the interior segment of one of the block copolymers mentioned above, e.g., an interior segment of a saturated triblock copolymer, have a unique balance of physical properties, which render them extraordinarily useful in a variety of applications. As the inventive sulfonated block copolymers are not crosslinked, these copolymers may be cast into membranes or coatings. In the casting process, the copolymers tend to self assemble into microphase separated structures. The sulfonate groups organize into a separate phase or ion channels. When these channels form a continuous structure spanning the distance between the two sides of the membrane they have a remarkable ability to transport water and protons. It is the integrity of the phase formed as a consequence of the separation of the end segments, which provides the membrane with strength. As the end segments have little or no sulfonate functionality, they are resistant to being plasticized by the addition of water, as well as by methanol. It is this effect that allows the generation of membranes with good wet strength. The hardness and flexibility of the membrane can be easily adjusted in two ways. The styrene content of the interior segment (B block) of the precursor block copolymer can be increased from a low level to 100% wt. As the styrene content of the interior segment is increased, the product sulfonated block copolymer membrane will become harder and less flexible. Alternatively, the end segment (A block) content of the precursor block copolymer may be increased from about 10% wt to about 90% wt with the effect that the resulting sulfonated block copolymer membrane will become harder and less flexible as the end block content of the polymer is increased. At lower end block contents, the membrane will be too weak; at end block contents above about 90% wt, the product membranes will have poor transport properties. They may also be crosslinked either chemically or thermally once in their final form.

By adjusting the structure of the precursor block copolymer, sulfonated polymer membranes may be prepared having surprising wet strength, well controlled and high rates of water and/or proton transport across the membrane, exceptional barrier properties for organic and non-polar liquids and gases, tunable flexibility and elasticity, controlled modulus, and oxidative and thermal stability. It is expected that the membranes would have good resistance to methanol transport and good retention of properties in the presence of methanol. As these membranes are not crosslinked, they can be reshaped or reprocessed by redissolving them in solvent and recasting the resulting solution; they may be reused or reshaped using various polymer melt processes, also.

An interesting feature of these uniformly microphase separated materials is that one phase readily absorbs water while the second phase is a much less polar thermoplastic. Water in the sulfonated phase could be heated using any of a variety of indirect methods, exposure to microwave or radio frequency radiation, to name a couple; the water heated in this way might transfer sufficient heat to the thermoplastic phase to allow softening or flow in this phase. Such a mechanism could be the basis for polymer "welding" or molding operations that would not require direct heating of the thermoplastic phase. Such a process could be very efficient because it doesn't require heating the whole part, fast because intensity can be controlled over a wide range, and safe because only the irradiated area will be hot resulting in lower overall part temperature. Such a process would be well suited to the assembly of articles from pieces of fabric. Rather than stitching the pieces together, they might be "welded" together—no stitching holes. It might also be used for electronic assemblies and building construction. In a related concept, films (to include compounded adhesive films) prepared from polymers of the present invention could be applied as single use adhesives and subsequently removed by treatment with water.

The block copolymers of the present invention have a number of significant and unexpected properties. For example, sulfonated block copolymers according to the present invention have a water vapor transport value greater than 1,000 g per $m^2$ per day using a gravimetric inverted cup method based on ASTM E 96/E 96M-05 hereby incorporated herein by reference in its entirety with external conditions of 25° C. and 50% relative humidity. The water vapor transport greater will preferably be greater than 1,000 g per $m^2$ per day and a wet tensile strength greater than 100 psi, preferably greater than 500 psi, according to ASTM D412, and a swellability of less than 100% by weight.

9. End Uses, Compounds and Applications

The sulfonated block copolymers according to the present invention can be used in a variety of applications and end uses. Such polymers having selectively sulfonated interior blocks will find utility in applications where the combination of good wet strength, good water and proton transport characteristics, good methanol resistance, easy film or membrane formation, barrier properties, control of flexibility and elasticity, adjustable hardness, and thermal/oxidative stability are important. In one embodiment of the present invention, the inventive sulfonated block copolymers are used in electrochemical applications, such as in fuel cells (separator phase), proton exchange membranes for fuel cells, dispersions of metal impregnated carbon particles in sulfonated polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The inventive sulfonated block copolymers are also used as desalination membranes, coatings on porous membranes, absorbents, personal hygiene articles, water gels and as adhesives. Additionally, the inventive block copolymers are used in protective clothing and breathable fabric applications where the membranes, coated fabrics, and fabric laminates could provide a barrier of protection from various environmental elements (wind, rain, snow, chemical agents, biological agents) while offering a level of comfort as a result of their ability to rapidly transfer water from one side of the membrane or fabric to the other, e.g., allowing moisture from perspiration to escape from the surface of the skin of the wearer to the outside of the membrane or fabric and vice versa. Full enclosure suits made from such membranes and fabrics might protect first responders at the scene of an emergency where exposure to smoke, a chemical spill, or various chemical or biological agents are a possibility. Similar needs arise in medical applications, particularly surgery, where exposure to biological hazards is a risk. Surgical gloves and drapes fabricated from these types of membranes are other applications that could be useful in a medical environment. Articles fabricated from these types of membranes could have antibacterial and/or antiviral and/or antimicrobial properties as reported in U.S. Pat. Nos. 6,537,538, 6,239,182, 6,028,115, 6,932,619 and 5,925,621 where it is noted that polystyrene sulfonates act as inhibitory agents against HIV (human immunodeficiency virus) and HSV (herpes simplex virus). In personal hygiene applications, a membrane or fabric of the present invention that would transport water vapor from perspiration while providing a barrier to the escape of other bodily fluids and still retain its strength properties in the wet environment would be advantageous. The use of these types of materials in diapers and adult incontinence constructions would be improvements over existing technologies. Fabrics can be made by either solution casting the sulfonated polymer on a liner fabric, or laminating a film of the sulfonated polymer between a liner fabric and a shell fabric.

The sulfonated block copolymers of the present invention can also be used in absorbent articles, and in particular with super absorbent materials. In particular, the sulfonated block copolymers could be used to contain and/or distribute water to the super absorbent particles. For example, the super absorbent particles could be encased in a film of the sulfonated block copolymer. In other embodiments, the materials of the present invention will be resistant to bacterial build up. The use of water-swellable, generally water-insoluble absorbent materials, commonly known as super absorbents, in disposable absorbent personal care products is known. Such absorbent materials are generally employed in absorbent products such as, for example, diapers, training pants, adult incontinence products, and feminine care products in order to increase the absorbent capacity of such products, while reducing their overall bulk. Such absorbent materials are generally present as a composite of super absorbent particles (SAP) mixed in a fibrous matrix, such as a matrix of wood pulp fluff. A matrix of wood pulp fluff generally has an absorbent capacity of about 6 grams of liquid per gram of fluff. The super absorbent materials (SAM) generally have an absorbent capacity of at least about 10 grams of liquid per gram of SAM, desirably of at least about 20 grams of liquid per gram of SAM, and often up to about 40 grams of liquid per gram of SAM.

In one embodiment of the present invention, the super absorbent material comprises a sodium salt of a cross-linked polyacrylic acid. Suitable super absorbent materials include, but are not limited to: Dow AFA-177-140 and Drytech 2035 both available from Dow Chemical Company, Midland, Mich.; Favor SXM-880 available from Stockhausen, Inc. of Greensboro, N. C.; Sanwet IM-632 available from Tomen America of New York, N.Y.; and Hysorb P-7050 available from BASF Corporation, Portsmouth, Va. Desirably, the absorbent composites of the present invention contain the above-described super absorbent materials in combination with the sulfonated block copolymers of the present invention, optionally containing a fibrous matrix containing one or more types of fibrous materials.

Applications such as coatings for potable water transport and storage devices would take advantage of the combination of good mechanical properties of these polymers in wet environments with their tendency to resist the growth of biologically active species. This feature of block copolymers selectively sulfonated in the interior segment might be usefully applied to waste water (both sewage and industrial waste) pipe and treatment facilities. In a like manner, polymers of the present invention might be used to inhibit mold growth on the surfaces of building materials. These polymers may well inhibit the growth of larger organisms as would be useful in avoiding fouling in various marine applications. It is known to use the self-assembly feature of selectively sulfonated block copolymers for the construction of humidity exchange cells as described in U.S. Pat. No. 6,841,601. In this application, polymers of the present invention would allow the fabrication of membrane elements with good wet strength and would not require reinforcement. This could simplify the construction of membrane energy recovery devices. Nonwoven house wrap material, such as TYVEK® supplied by DuPont, are currently used in home construction to keep the elements of wind and weather from penetrating the exterior of the house. In some environments, this technology does not allow sufficient transport of water vapor through the walls of the house with the result that conditions for the growth of mold develop in the walls of the home. An assembly prepared from polymers of the present invention might provide equally good barrier performance with the advantage of allowing effective escape of water vapor from the walls of the house. In a similar way, there is a need for a backing material for carpets that allows the transport for water vapor. This need is critical in homes that use concrete slab construction where water flow through the concrete can be significant in periods of high humidity or excessive rain. If the carpet backing does not transport the water vapor at an equal rate, the build up of condensed water between the back of carpet and the surface of the slab can be problematic. Carpets backed with a polymer coating based upon polymers of the present invention could overcome this problem.

The sulfonated polymers of the present invention may also be used as flame retardant materials—particularly for spraying a flammable article in the path of an advancing fire. Such sulfonated polymers may be an excellent "carrier" for conventional ignition retardant materials, which tend not to be compatible with conventional hydrocarbon polymers.

Furthermore, the inventive sulfonated block copolymers can also be used as a membrane to gather moisture from the environment. Accordingly, such membranes may be used to collect fresh water from the atmosphere in a situation where there is no ready supply of decent quality water.

Further, the copolymers of the present invention can be compounded with other components not adversely affecting the copolymer properties. The block copolymers of the present invention may be blended with a large variety of other polymers, including olefin polymers, styrene polymers, tackifying resins, hydrophilic polymers and engineering thermoplastic resins, with polymer liquids such ionic liquids, natural oils, fragrances, and with fillers such as nanoclays, carbon nanotubes, fullerenes, and traditional fillers such as talcs, silica and the like.

In addition, the sulfonated polymers of the present invention may be blended with conventional styrene/diene and hydrogenated styrene/diene block copolymers, such as the styrene block copolymers available from Kraton Polymers LLC. These styrene block copolymers include linear S-B-S, S-I-S, S-EB-S, S-EP-S block copolymers. Also included are radial block copolymers based on styrene along with isoprene and/or butadiene and selectively hydrogenated radial block copolymers.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene and styrene/olefin copolymers. Representative styrene/olefin copolymers are substantially random ethylene/styrene copolymers, preferably containing at least 20, more preferably equal to or greater than 25 weight percent copolymerized styrene monomer.

For the purposes of the specification and claims, the term "engineering thermoplastic resin" encompasses the various polymers such as for example thermoplastic polyester, thermoplastic polyurethane, poly(aryl ether) and poly(aryl sulfone), polycarbonate, acetal resin, polyamide, halogenated thermoplastic, nitrile barrier resin, poly(methyl methacrylate) and cyclic olefin copolymers, and further defined in U.S. Pat. No. 4,107,131, the disclosure of which is hereby incorporated by reference.

Tackifying resins include polystyrene block compatible resins and rubber compatible resins. The polystyrene block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the hydrogenated (interior) block may be selected from the group consisting of compatible C5 hydrocarbon resins, hydrogenated C5 hydrocarbon resins, styrenated C5 resins, C5/C9 resins, styrenated terpene resins, fully hydrogenated or partially hydrogenated C9 hydrocarbon resins, rosins esters, rosins derivatives and mixtures thereof. These resins are e.g. sold under the trademarks "REGALITE", "REGALREZ", "ESCOREZ" and "ARKON.

Hydrophilic polymers include polymeric bases which are characterized as having an available pair of electrons. Examples of such bases include polymeric amines such as polyethyleneamine, polyvinylamine, polyallylamine, polyvinylpyridene, and the like; polymeric analogs of nitrogen containing materials such as polyacrylamide, polyacrylonitrile, nylons, ABS, polyurethanes and the like; polymeric analogs of oxygen containing compounds such as polymeric ethers, esters, and alcohols; and acid-base hydrogen bonding interactions when combined with glycols such as polyethylene glycol, and polypropylene glycol, and the like, polytetrahydrofuran, esters (including polyethylene terephthalate, polybutyleneterephthalate, aliphatic polyesters, and the like), and alcohols (including polyvinylalcohol), poly saccharides, and starches. Other hydrophilic polymers that may be utilized include sulfonated polystyrene. Hydrophilic liquids such as ionic liquids may be combined with the polymers of the present invention to form swollen conductive films or gels.

Ionic liquids such as those described in U.S. Pat. Nos. 5,827,602 and 6,531,241 (which disclosures are herein incorporated by reference) could be introduced into the sulfonated polymers either by swelling a previously cast membrane, or by adding to the solvent system before casting a membrane, film coating or fiber. Such a combination might find usefulness as a solid electrolyte or water permeable membrane.

Exemplary materials that could be used as additional components would include, without limitation:

1) pigments, antioxidants, stabilizers, surfactants, waxes, and flow promoters;
2) particulates, fillers and oils; and
3) solvents and other materials added to enhance processability and handling of the composition.

With regard to the pigments, antioxidants, stabilizers, surfactants, waxes and flow promoters, these components, when utilized in compositions with the sulfonated block copolymers of the present invention may be included in amounts up to and including 10%, i.e., from 0 to 10%, based on the total weight of the composition. When any one or more of these components are present, they may be present in an amount from about 0.001 to about 5%, and even more preferably from about 0.001 to about 1%.

With regard to particulates, fillers and oils, such components may be present in an amount up to and including 50%, from 0 to 50%, based on the total weight of the composition. When any one or more of these components are present, they may be present in an amount from about 5 to about 50%, preferably from about 7 to about 50%.

Those of ordinary skill in the art will recognize that the amount of solvents and other materials added to enhance processability and handling of the composition will in many cases depend upon the particular composition formulated as well as the solvent and/or other material added. Typically such amount will not exceed 50%, based on the total weight of the composition.

The sulfonated block copolymers of the present invention can be used to make any of the articles noted above and in many instances will take any number of forms such as in the form of a film, sheet, coating, band, strip, profile, molding, foam, tape, fabric, thread, filament, tube, hollow fiber, ribbon, fiber, plurality of fibers or, fibrous web. Such articles can be formed by a variety of processes such as for example casting, injection molding, over molding, dipping, extrusion (when the block copolymer is in neutralized form), roto molding, slush molding, fiber spinning (such as electrospinning when the block copolymer is in neutralized form), film making, painting or foaming.

Applicants further claim a method of varying the transport properties of a film cast out of the block copolymers of the present invention. By using a solvent mixture that comprises two or more solvents selected from polar solvents and non-polar solvents, it is possible to obtain different structures which demonstrate different mechanisms of storing water. This in turn allows for the use of the block copolymers of the present invention to fine tune transport properties for particular uses utilizing a single class of block copolymers, i.e., the block copolymers of the present invention. Preferably, the polar solvents utilized in the method of the present invention are selected from water, alcohols having from 1 to 20 carbon atoms, preferably from 1 to 8 carbon atoms, more preferably from 1 to 4 carbon atoms; ethers having from 1 to 20 carbon atoms, preferably from 1 to 8 carbon atoms, more preferably from 1 to 4 carbon atoms, including cyclic ethers; esters of carboxylic acids (including the esters formed during the neutralization of the carboxylic acid), esters of sulfuric acid, amides, carboxylic acids, anhydrides, sulfoxides, nitriles, and ketones having from 1 to 20 carbon atoms, preferably from 1 to 8 carbon atoms, more preferably from 1 to 4 carbon atoms, including cyclic ketones. More specifically, the polar solvents are selected from methanol, ethanol, propanol, isopropanol, dimethyl ether, diethyl ether, dipropyl ether, dibutyl ether, substituted and unsubstituted furans, oxetane, dimethyl ketone, diethyl ketone, methyl ethyl ketone, substituted and unsubstituted tetrahydrofuran, methyl acetate, ethyl acetate, propyl acetate, methylsulfate, dimethylsulfate, carbon disulfide, formic acid, acetic acid, sulfoacetic acid, acetic anhydride, acetone, cresol, creosol, dimethylsulfoxide (DMSO), cyclohexanone, dimethyl acetamide, dimethyl formamide, acetonitrile, water and dioxane, with water, tetrahydrofuran, methanol, ethanol, acetic acid, sulfoacetic acid, methylsulfate, dimethylsulfate, and IPA being the more preferred of the polar solvents. Also included are amines such as dimethyl amine, triethyl amine and aniline, among other amines.

Preferably the non-polar solvents utilized in the method of the present invention are selected from toluene, benzene, xylene, mesitylene, hexanes, heptanes, octanes, cyclohexane, chloroform, dichloroethane, dichloromethane, carbon tetrachloride, triethylbenzene, methylcyclohexane, isopentane, and cyclopentane, with toluene, cyclohexane, methylcyclohexane, cyclopentane, hexanes, heptanes, isopentane, nonane, decane and dichloroethane being the most preferred non-polar solvents, along with mixtures of solvents. Also included are aliphatic hydrocarbons having a boiling point range of about 70 to about 220° C. As noted, the method utilizes two or more solvents. This means that two, three, four or more solvents selected from polar solvents alone, non-polar solvents alone or a combination of polar solvents and non-polar solvents may be used. The ratio of the solvents to one another can vary widely. For examples, in solvent mixtures having two solvents, the ratio can range from 99.99:0.01 to 0.01:99.9. The conditions under which the films are cast can vary. Preferably, the films will be cast in air, at a temperature from 10° C. to 200° C., preferably room temperature and onto the surface from which the film can be released easily. More preferably, the membranes will be cast in a humid environment. Alternately the cast solution may be contacted with a non-solvent for the polymer, thereby removing the solvent and forming the solid film or article. Alternately a coated article may be prepared by passing the porous or non-porous article through a solution of the polymer and optionally wetting agents. The solvent can then be removed by drying or by extraction using a non-solvent for the polymer.

The following examples are intended to be illustrative only, and are not intended to be, nor should they be construed as limiting in any way of the scope of the present invention Example #1

Preparing A Styrene Block Copolymer Labeled SB-2 of the Structure $(ptBS-EB-S)_n$ A styrene block copolymer labeled SB-2 of the structure $(ptBS-EB-S)_n$, containing 42% styrene (S) and 43% para-tert-butylstyrene (i.e., p-t-butylstyrene or ptBS) by weight, was prepared in this example. In this $(ptBS-EB-S)_n$ polymer, S was considered the interior block "B" for calculating the styrene content in the interior block.

The SB-2 polymer is a selectively hydrogenated $(A-D-B)_n$ X block copolymer where the A block is a polymer block of p-t-butylstyrene and the B block is a polymer block of unsubstituted styrene. The block labeled D is hydrogenated butadiene (EB) and X is a silicon containing residue of the coupling agent tetramethoxysilane.

In the preparation of SB-2, anionic polymerization of p-t-butylstyrene in cyclohexane was initiated using s-butyllithium (s-BuLi) affording an A block having an estimated molecular weight of about 22,000 g/mol. A portion of this solution was transferred to a second reactor containing cyclohexane, 10 ppm of 1,2-diethoxypropane, and butadiene, and polymerization was allowed to proceed to afford a second segment with a molecular weight of 28,000 g/mol (ptBS-Bd-Li). The polybutadiene segment had a 1,2-addition content of about 40 wt %. Styrene monomer was added to the living (ptBS-Bd-Li) diblock copolymer solution to produce a living triblock copolymer (ptBS-Bd-S-Li) having a third block composed only of polystyrene (S block MW=25,000 g/mol). The living polymer solution was coupled using tetramethoxysilane (about Si/Li=0.41/1 (mol/mol)) as the coupling agent. A mixture of branched ((ptBS-Bd-S)3) (major component) and linear ((ptBS-Bd-S)2) coupled polymers was obtained.

The polymer was hydrogenated using a standard cobalt catalyst affording the desired (A-D-B)nX block copolymer, which was a mixture of branched ((ptBS-EB-S)3) (major component) and linear ((ptBS-EB-S)2) coupled polymers. As the interior segment of this polymers contained only polystyrene and the end segments contained only poly-p-t-butylstyrene, the interior segments of these polymers were much more susceptible to sulfonation than were the end segments. The hydrogenated Bd segment, an EB polymer block, was sulfonation resistant and acted as a toughening spacer block between the poly-p-t-butylstyrene end segments and the sulfonated polystyrene center segment.

The SB-2 polymer contains about 42 wt % polystyrene, about 43 wt % poly-p-t-butylstyrene, and about 15 wt % hydrogenated polybutadiene (EB). The product is obtained as a solution of polymer in cyclohexane. Polymer solids were determined to be 15.65 wt % as measured by gravimetric difference upon drying of a sample in a vacuum oven at 50° C. for 2 hours.

Example #2

Preparation of Sulfonated Polymer Used to Form Membrane of FIG. 1

This example demonstrates the level of isobutyric acid that is generated in a sulfonation of styrene block copolymer SB-2 with isobutyryl sulfate in cyclohexane.

About 222 lb of the SB-2 polymer hydrogenation product of Example 1, which corresponds to about 34.7 lb of polymer solids in cyclohexane, were added to a N2-flushed 500 gallon glass-lined stirred tank reactor equipped with a water jacket. About 473 lb of cyclohexane were then added to this mixture to afford a polymer solution comprising about 5 wt % of the SB-2 polymer. The reactor was purged three times with $N_2$ and then maintained with $N_2$ at about 15-20 psia. Agitation was commenced while heating the solution to about 25-30° C., and then about 21.13 lb (60.58 moles) of isobutyric anhydride were added to the solution, followed by about 10.61 lb (46.61 moles) of a reagent grade sulfuric acid (about 95% concentration). Based on the reagent charge, the molar ratio of sulfuric acid to styrene repeat units in the polymer was about 0.73 and the molar ratio of isobutyric anhydride to sulfuric acid was about 1.3.

The reaction mixture was stirred for approximately 2 hours at about 30° C. and was then heated over the course of about 2 hours to about 50° C., and was then maintained at about 50° C. for an additional approximately 4 hours. The reaction mixture was then allowed to gradually cool for about 12 hours, affording a dark brown, low viscosity liquid with a slight blue opaque appearance and absent of any visual signs of gelation.

The reaction product was analyzed by two separate titrations (the "two-titration method") to determine the levels of styrenic polymer sulfonic acid, sulfuric acid, non-polymeric by-product sulfonic acid (2-sulfoisobutyric acid), and non-sulfonated by-product isobutyric acid. For each titration, an aliquot of about five (5) grams of the reaction product solution was dissolved in about 100 mL of tetrahydrofuran and about 2 mL of water and about 2 mL of methanol were added. In the first titration, the prepared solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the prepared solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations with the following results: about 0.1168 mmol/g polymer sulfonic acid, about 0.01147 mmol/g sulfuric acid, about 0.0083 mmol/g 2-sulfoisobutyric acid, and about 0.3537 mmol/g isobutyric acid. Based on mass balance, the degree of styrene sulfonation was calculated to be about 60.7 mol %, which corresponds to about 2.05 milliequivalents of sulfonic acid per gram of sulfonated polymer (2.05 meq/g). The residual non-sulfonated carboxylic acid, as isobutyric acid, was calculated from the titration results to be 3.12 wt % based on the total weight of solution.

Example #3

Figure 2:
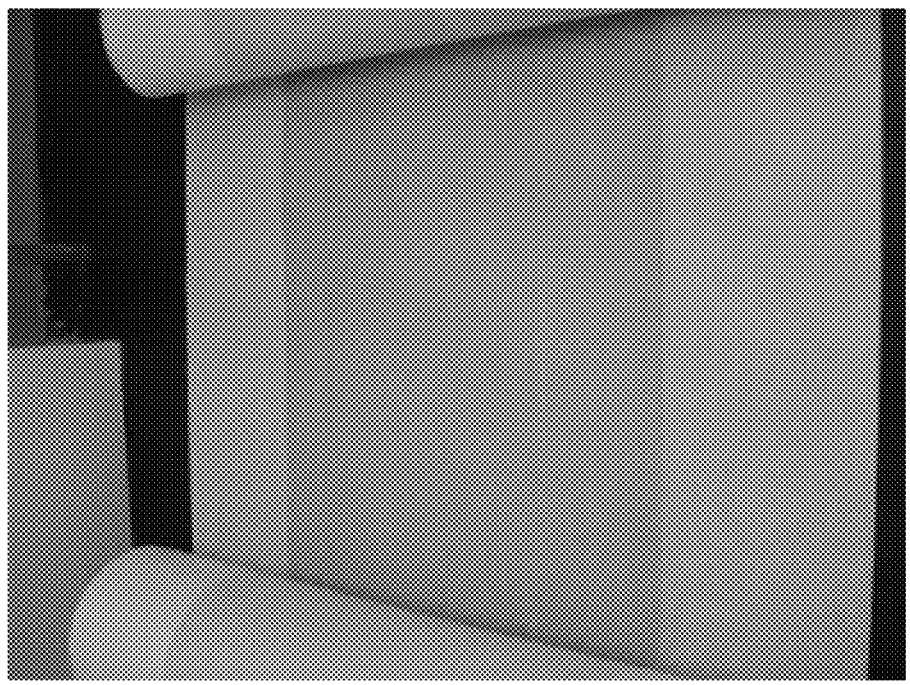
FIG. 2 shows a photograph of a membrane formed by the process of the present invention containing less than about 0.5 wt % of residual isobutyric acid and about 3 wt % of ethyl isobutyrate—i.e., the ethyl ester of isobutyric acid formed by the reaction of ethanol and isobutyric acid.

Preparation of Sulfonated Polymer Used to Form Membrane of FIG. 2

The solution prepared in Example #2 was contacted with 3 molar equivalents of ethanol relative to isobutyric acid and was then stirred at room temperature overnight allowing for the esterification of the isobutyric acid to ethyl isobutyrate. A change in the odor from that of isobutyric acid to the sweet/fruity odor of ethyl isobutyrate was observed. According to the results shown in Example #5, 6, approximately 97.7% of the isobutyric acid was converted to ethyl isobutyrate resulting in less than 0.01 meq of isobutyric acid per gram of sulfonated polymer solution.

Example #4

Esterification in Sulfonated Polymer Solution as a Function of Methanol to Isobutyric Acid Mole Ratio These examples demonstrate the effect of methanol to isobutyric acid molar ratio on the extent of isobutyric acid esterification upon treatment of sulfonated styrene block copolymer solution with methanol. For each example in Table A, about 15 g of the sulfonated polymer solution described in Example #1 was added to a 1 ounce glass jar equipped with a magnetic stir bar. The polymer solution contained 0.3542 meq/g of isobutyric acid. With good stirring, the prescribed amount of anhydrous methanol was added dropwise, the jar was tightly capped, and the reaction vessel was then placed in a 50° C. oven for about 18 hours. After the sample had cooled to room temperature, an aliquot was analyzed by titration with 0.14 N NaOH as described in Example #2. Correcting for the slight dilution of the polymer solution as a result of the addition of methanol, the amount of isobutyric acid in the equilibrated sample was calculated from the titration results. Results are summarized in Table A.

TABLE A

|  | Example | | | | | |
| --- | --- | --- | --- | --- | --- | --- |
|  | 4.1 | 4.2 | 4.3 | 4.4 | 4.5 | 4.6 |
| Mass polymer solution (g) | 15.01 | 15.06 | 15.02 | 15.02 | 15.06 | 15.05 |
| Mass methanol (g) | 0.088 | 0.133 | 0.177 | 0.266 | 0.354 | 0.531 |
| Mole ratio methanol to isobutyric acid in reaction charge | 0.49 | 0.82 | 1.02 | 1.51 | 2.01 | 3.01 |
| meq/g isobutyric acid upon equilibration | 0.1883 | 0.0772 | 0.0269 | 0.0080 | 0.0068 | 0.0068 |
| wt % isobutyric acid in equilibrated sample | 1.66 | 0.68 | 0.24 | 0.07 | 0.06 | 0.06 |
| Mol % conversion of isobutyric acid to methyl isobutyrate | 46.5 | 78.0 | 92.3 | 97.7 | 98.0 | 98.0 |

Collectively, these examples demonstrate that >90 mol % conversion from isobutyric acid to methyl isobutyrate can be achieved by the addition of about 1 or more molar equivalents of methanol relative to the amount of isobutyric acid in sulfonated polymer solution.

Example #5

Esterification in Sulfonated Polymer Solution as a Function of Ethanol to Isobutyric Acid Mole Ratio These examples demonstrate the effect of ethanol to isobutyric acid molar ratio on the extent of isobutyric acid esterification upon treatment of sulfonated styrene block copolymer solution with ethanol. The experiments described in Example #4 were repeated on a smaller scale, using anhydrous ethanol in place of methanol. Results are summarized in Table B.

Example #6

Kinetics of Isobutyric Acid Esterification with Alcohol in Sulfonated Polymer Solutions These examples demonstrate conversion of isobutyric acid to isobutyric ester as functions of time upon treatment with alcohol at 50° C. of sulfonated polymer solutions prepared in a mixture of n-heptane and cyclohexane.

A styrene block copolymer labeled SB-7 of the structure $(ptBS-EB-S)_n$ was prepared in a method comparable to that used to prepare the SB-2 polymer described in Example #1. The SB-7 polymer was obtained as a raw solution of about 23.96% by weight in cyclohexane.

About 910.7 g of the styrene block copolymer SB-7 in cyclohexane, corresponding to about 218.2 g of polymer solids, were added to a 5 L four-neck round bottom flask equipped with an overhead mechanical stirrer, a drying tube filled with $Ca(SO_4)_2$, a stopper, and a thermocouple. The solution was heated to about 50° C. while stirring at 250 RPM and then about 1998.6 g of n-heptane were then added to the solution to afford a polymer solution comprising about 7.5% of the SB-7 polymer on a solids basis. The solution was re-heated to about 50° C., and then about 128.83 g (0.814 moles) of isobutyric anhydride was added to the solution, followed by about 64.67 g (0.626 moles) of a reagent grade sulfuric acid (about 95% concentration). Based on the reagent charge, the molar ratio of sulfuric acid to styrene repeat units in the polymer was about 0.71 and the molar ratio of isobutyric anhydride to sulfuric acid was about 1.3.

The reaction mixture was stirred for approximately 5 hours at about 50° C. Upon cooling, a dark brown, low viscosity liquid that was absent of any visual signs of gelation was obtained. The reaction product was analyzed by the two-titration method as described in Example #2 with the following results: about 0.1640 mmol/g polymer sulfonic acid,

TABLE B

|  | Example | | | | | |
| --- | --- | --- | --- | --- | --- | --- |
|  | 5.1 | 5.2 | 5.3 | 5.4 | 5.5 | 5.6 |
| Mass polymer solution (g) | 3.00 | 3.12 | 3.04 | 3.20 | 3.14 | 3.39 |
| Mass ethanol (g) | 0.025 | 0.040 | 0.051 | 0.081 | 0.106 | 0.173 |
| Mole ratio ethanol to isobutyric acid in reaction charge | 0.44 | 0.74 | 1.00 | 1.49 | 1.92 | 3.01 |
| meq/g isobutyric acid upon equilibration | 0.2321 | 0.1269 | 0.0505 | 0.105 | 0.0081 | 0.0081 |
| wt % isobutyric acid in equilibrated sample | 2.05 | 1.12 | 0.44 | 0.09 | 0.07 | 0.07 |
| Mol % conversion of isobutyric acid to ethyl isobutyrate | 36.4 | 65.0 | 86.0 | 97.1 | 97.8 | 97.7 | about 0.0132 mmol/g sulfuric acid, about 0.0169 mmol/g 2-sulfoisobutyric acid, and about 0.5020 mmol/g isobutyric acid. Calculated based on the mass balance, the degree of styrene sulfonation was about 57.82 mol %, which corresponds to about 1.97 milliequivalents of sulfonic acid per gram of sulfonated polymer. The residual non-sulfonated carboxylic acid, as isobutyric acid, was calculated from the titration results to be 4.42 wt % based on the total weight of solution.

For each example, about 95 g of the sulfonation reaction product of SB-7 were added to a 500 mL four-neck round bottom flask equipped with an overhead mechanical stirrer, a drying tube filled with Ca(SO4)2, a stopper, and a thermocouple. The solution was heated to about 50° C. while stirring at 250 RPM and then the prescribed amount of alcohol was added dropwise over about 30 seconds. The reaction mixture was then maintained at 50° C. and ~3 g aliquots were removed periodically for analysis by titration with 0.14 N NaOH as described in Example #2. Correcting for the slight dilution of the polymer solution as a result of the addition of alcohol, the amount of isobutyric acid in the removed aliquots was calculated from the titration results. Results are summarized in Table C.

TABLE C

| | Rxn Time | Example | | |
|---|---|---|---|---|
| | (minutes) | 6.1 | 6.2 | 6.3 |
| Mass polymer solution (g) | | 96.4 | 93.3 | 91.3 |
| Alcohol | | MeOH | EtOH | EtOH |
| Mass alcohol (g) | | 1.55 | 2.16 | 6.35 |
| Mole ratio alcohol to isobutyric acid in reaction charge | | 1.00 | 1.00 | 3.01 |
| wt % isobutyric acid in polymer solution | 10 | 2.48 | 3.72 | 2.94 |
| | 20 | 1.83 | 3.23 | 2.19 |
| | 60 | 0.90 | 2.22 | 0.85 |
| | 120 | 0.58 | 1.47 | |
| | 150 | 0.53 | | |
| | 160 | | | 0.15 |
| | 270 | | 0.82 | |

The data in Table C demonstrate that residual isobutyric acid in a sulfonated polymer solution containing in excess of 4 wt % isobutyric acid can be reduced to below 1 wt % through esterification with methanol or ethanol at 50° C. within about 1 to 3 hours. Furthermore, the data demonstrate that a faster reaction is achieved with methanol as compared to ethanol when used at comparable stoichiometry. In addition, the data demonstrate that increasing the mol ratio of alcohol to isobutyric acid results in faster reaction.

Example #7

Selection of Alcohol for Esterification

Figure 4:
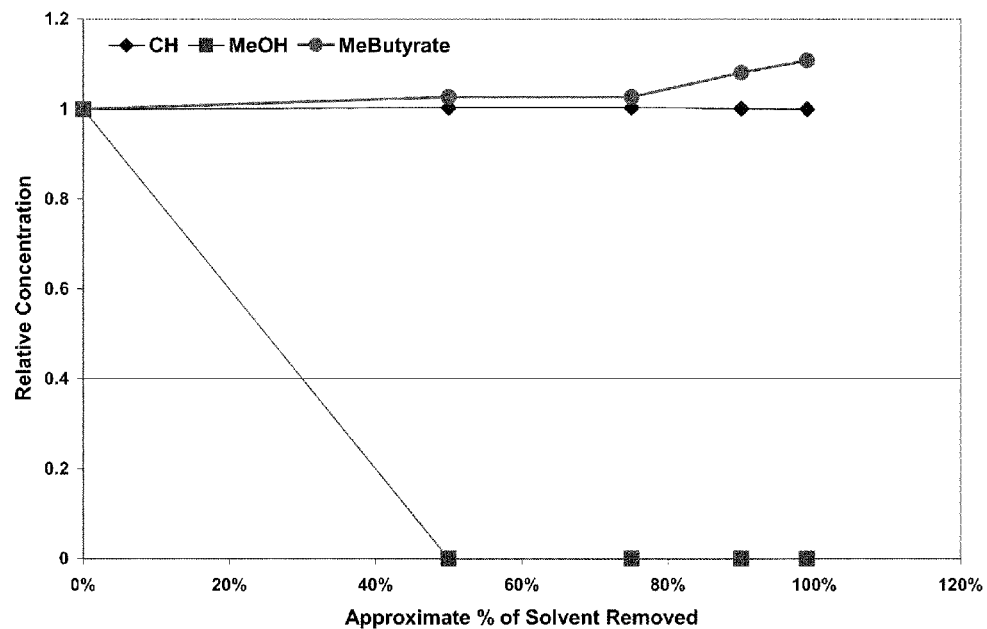
FIG. 4 shows the relative concentration of methanol, cyclohexane and methyl isobutyrate as a function of evaporation.
Figure 5:
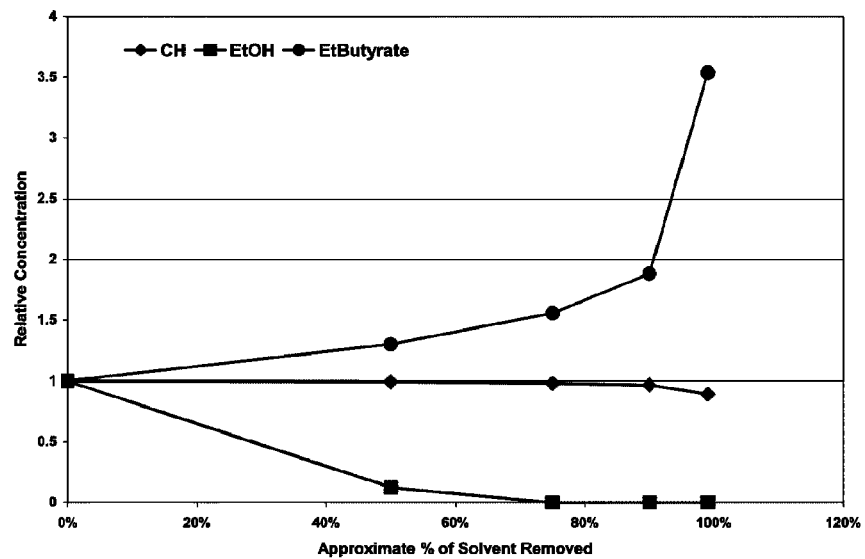
FIG. 5 shows the relative concentration of ethanol, cyclohexane and ethyl isobutyrate as a function of evaporation.

Model solutions were prepared to study the relative removal rates of the solvents in the sulfonated polymer solution. The solutions were prepared with a 1.5 molar excess of the alcohol to isobutyric acid and the initial concentrations are shown in Table D. Methanol, ethanol, methyl isobutyrate and ethyl isobutyrate were purchased from Sigma-Aldrich and used as-received. The solutions were mixed overnight, poured into a flask, attached to a rotary evaporator and slowly heated to 50° C. The solvent mixture was evaporated under reduced pressure. The vacuum was periodically removed and aliquots of the solvent mixture were taken and analyzed with $^1$H NMR to determine the composition. FIGS. 4 and 5 show the relative composition of the methyl and ethyl isobutyrate model solutions, respectively, as a function of solvent removal. From FIG. 4, it is evident that the methanol is removed during the removal of 50% of the solution and the relative ratios of cyclohexane and methyl isobutyrate remain relatively constant during the evaporation of the solution. From FIG. 5, it is evident that the ethanol is not removed until only 25% of the solution remained indicating that ethanol is more difficult to remove than methanol. It is also evident from FIG. 5 that the relative concentration of ethyl isobutyrate greatly increases during the evaporation of the solution. This indicates that ethyl isobutyrate is much more difficult to remove than methyl isobutyrate and is concentrated relative to cyclohexane during evaporation.

TABLE D

| Sample | wt % cyclohexane | wt % and type of alcohol | wt % ester |
|---|---|---|---|
| Methyl isobutyrate | 95.6 | 0.66 methanol | 3.77 |
| Ethyl isobutyrate | 95 | 0.8 ethanol | 4.2 |

Example #8

Casting Membranes from Sulfonated Solution Without Esterification

Membranes from the sulfonated polymer solution (5.6 wt % polymer in cyclohexane, as prepared in Example 2) without esterification were cast using a commercially available film casting line manufactured by Coatema Coating Machinery GmbH. The casting line consisted of a micro pump which pumped the sulfonated polymer solution through a slot die with a 150 µm spacer. The solution was coated on a release paper siliconized with silicone RC 1002 produced by Degussa. Coating weight was varied by changing either the pump speed or the speed of the release substrate. The sulfonated polymer solution cast on the release substrate passed through two convection ovens (each 1.5 m long) set at temperatures between 40 and 60° C. at a speed of 1 m/min. This residence time and temperature was sufficient to remove the aliphatic solvent. The coated substrate then passed through two infrared ovens (each 1.5 m) long that were not used during the trial before being wound into rolls. The final membrane thickness varied between 10 and 40 µm depending on the pump speed. The "dried" membranes had a strong odor of isobutyric acid indicating it was not fully removed. Upon unrolling the membrane two weeks later, the membranes cracked and shattered when then contacted air and continued to have a strong odor of isobutyric acid. Inspection of the membranes indicated that the edges of the membrane slightly adhered to the release substrate. During the unrolling, the residual isobutyric acid released from the membranes causing the membrane to contract. The slight adhesion of the membrane to the release substrate restricted the contraction leading to the shattering of the membrane as shown in FIG. 1.

Example #9

Casting Membranes from Sulfonated Solution with Esterification

The same solution used in Example #8 was contacted with a 3 molar excess of ethanol and stirred at room temperature overnight allowing for the esterification of the isobutyric acid to ethyl isobutyrate as described in Example #3. A change in the odor from that of isobutyric acid to the sweet/fruity odor of ethyl isobutyrate was observed. Membranes from the sulfonated polymer solution following esterification were cast using the same casting equipment as in Example #8. Casting conditions and the release paper and coating also mimicked the previously mentioned example. This residence time and temperature was sufficient to remove the aliphatic solvent. The final membrane thickness varied between 10 and 40 μm depending on the pump speed. The dried membranes had the slight odor of ethyl isobutyrate indicating it was not fully removed. Upon unrolling the membrane two weeks later, the membranes were easily removed from the release substrate with the exception of some weak adhesion at the edges of the membrane. The free standing membranes were dimensionally stable and showed no sign of cracking or shattering when contacted with air and had little odor of ethyl isobutyrate. From this example it is obvious that the conversion of isobutyric acid to ethyl isobutyrate was an improvement in the process of casting membranes.

While slot die coating was utilized in this example, coating methods such as reverse roll coating and other known to those skilled in the art could be utilized. Drying mechanism other than hot air convection known to those skilled in the art could also be utilized to remove the solvent(s) from the sulfonated polymer solution. Similarly, other materials could be utilized as the substrate including other release papers, foils, etc. and other membranes such as expanded PTFE, micro and ultrafiltration membranes, non-woven substrates and other materials known by those skilled in the art.

Example #10

Figure 6:
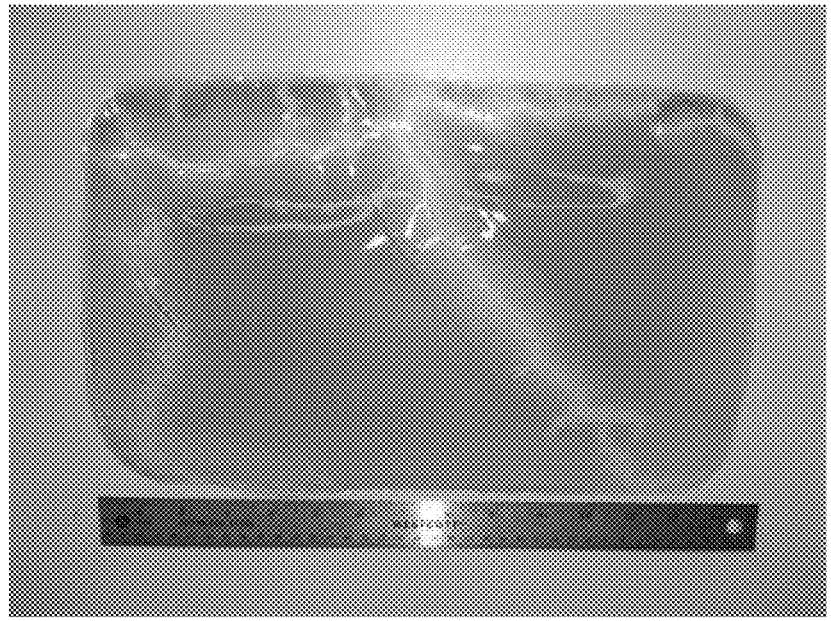
FIG. 6 shows a membrane hand cast in a dry environment (low relative humidity).

Hand Casting Membranes from Sulfonated Solution with Esterification in a Dry Environment A sulfonated polymer solution described in Table E was cast using a doctor blade in a controlled atmosphere box with a dry nitrogen gas sweep to ensure a low relative humidity environment. The solvent was allowed to dry at room temperature overnight. The resulting membrane was cracked as shown in FIG. 6.

Example #11

Figure 7:
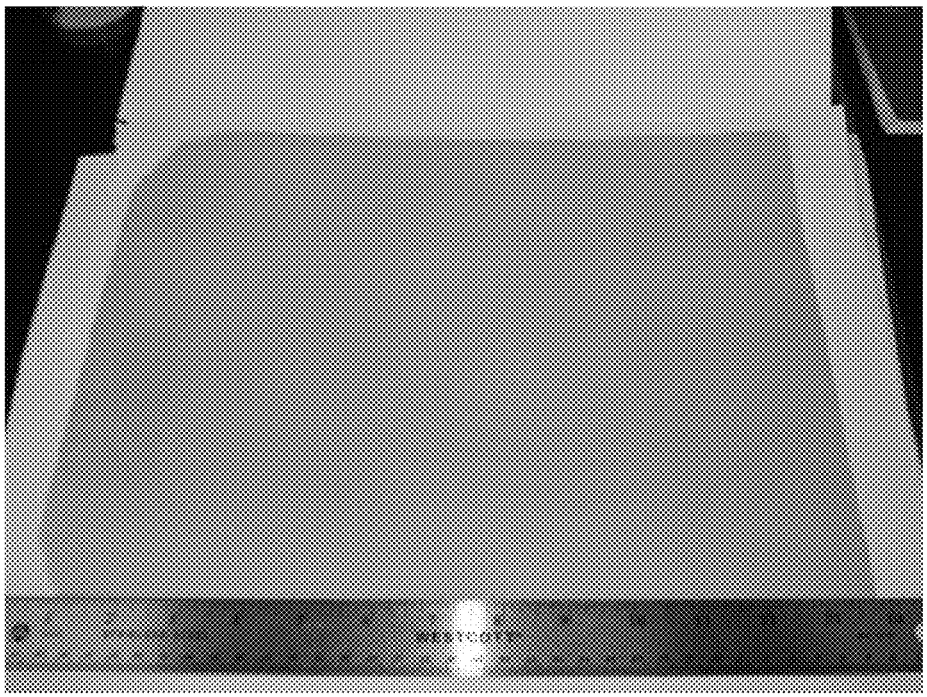
FIG. 7 shows a membrane hand cast in a humid environment (high relative humidity).

Hand Casting Membranes from Sulfonated Solution with Esterification in a Humid Environment The same solution used in Example #10 (described in Table E) was cast using a doctor blade in a controlled atmosphere box with a water bath. The relative humidity in the controlled atmosphere box was approximately 60%. As in Example #10, the solvent was allowed to dry at room temperature overnight. The resulting membrane was flat and showed no signs of gross defects as shown in FIG. 7. The casting of membranes in relatively high humidity environments appears to produce a much more homogenous and defect-free membrane.

TABLE E

| wt % tBS | wt % styrene | cosolvent | wt % sulfonated polymer in solution | Ratio of ethanol to isobutyric acid | meq/g unreacted isobutyric acid | meq/g styrene sulfonic acid, 100% polymer basis | Ratio of heptane to cyclohexane |
|---|---|---|---|---|---|---|---|
| 25 | 51 | heptane | 11.03 | 1:01 | 0.0428 | 1.832 | 1.25 |

What is claimed is:

1. A process for preparing sulfonated block polymers, comprising the steps of:
   (a) providing a precursor block copolymer having at least two end blocks A and at least one interior block B, wherein each A block is a polymer block resistant to sulfonation and each B block is a polymer block susceptible to sulfonation;
   (b) reacting the precursor block polymer with a C2 to C8 acyl sulfate in a reaction mixture further comprising at least one non-halogenated aliphatic solvent to form a sulfonated block polymer, therein resulting in the formation of a solution of a sulfonated block copolymer and a residual carboxylic acid; and
   (c) subsequently reacting the residual carboxylic acid contacted with a C1 to C4 alcohol or mixture thereof in a molar ratio of alcohol to residual carboxylic acid of at least 0.9:1 to form the corresponding alkyl esters of the carboxylic acid and to reduce the residual level of the organic residual acid to less than 2.0 wt % based on the total weight of the solution,
   wherein the reaction mixture is free of any halogenated solvent.

2. The process of claim 1 wherein the C2 to C8 acyl sulfate is isobutyryl sulfate or propionyl sulfate, which is formed by the reaction of isobutyric anhydride or propionic anhydride and sulfuric acid, and the residual carboxylic acid is isobutyric acid or propionic acid.

3. The process of claim 2 wherein the initial concentration of the precursor block copolymer is in the range from about 0.1 wt % to about 30 wt % based on the total weight of the reaction mixture.

4. The process of claim 2 wherein the sulfonation reaction is conducted in the presence of a solvent mixture of hydrocarbon solvents having a boiling point range of between 70 and 220° C.

5. The process of claim 2 wherein the precursor block copolymer has the general configuration A-B-A, A-B-A-B-A, (A-B-A)$_n$X, (A-B)$_n$X, A-D-B-D-A, A-B-D-B-A, (A-D-B)$_n$X, (A-B-D)$_n$X, (A-B-B)$_n$X, A-B-B-B-A or mixtures thereof where the B blocks may be the same or different, where n is an integer from 2 to 30, X is a coupling agent residue, and each D block is a polymer block resistant to sulfonation and where the precursor block copolymer is free of olefinic unsaturation.

6. The process of claim 5 wherein the molar ratio of alcohol to residual isobutyric acid is 0.9:1 to 4:1 and the solution of sulfonated block copolymer containing residual isobutyric acid contains less than 1.0 wt % isobutyric acid.

7. The process of claim 5 wherein said A block is a polymer block of para-t-butylstyrene, said B block is a polymer block of unsubstituted styrene and said D block is a polymer block of isoprene or 1,3-butadiene wherein 20 to 80 mol percent of the condensed butadiene units in block D have 1,2-configuration, said ester of residual carboxylic acid is the methyl or ethyl ester of isobutyric acid and said non-halogenated aliphatic solvent has a boiling point range of between 70 and 220° C.

* * * * *